US010750514B2

(12) United States Patent
Fujinami

(10) Patent No.: US 10,750,514 B2
(45) Date of Patent: Aug. 18, 2020

(54) NETWORK CONTROL APPARATUS, COMMUNICATION APPARATUS, NETWORK CONTROL METHOD, COMMUNICATION METHOD, COMMUNICATION SYSTEM, AND PROGRAM

(71) Applicant: NEC Corporation, Tokyo (JP)

(72) Inventor: Makoto Fujinami, Tokyo (JP)

(73) Assignee: NEC Corporation, Tokyo (JP)

(*) Notice: Subject to any disclaimer, the term of this patent is extended or adjusted under 35 U.S.C. 154(b) by 19 days.

(21) Appl. No.: 15/118,595

(22) PCT Filed: Feb. 13, 2015

(86) PCT No.: PCT/JP2015/000675
§ 371 (c)(1),
(2) Date: Aug. 12, 2016

(87) PCT Pub. No.: WO2015/122198
PCT Pub. Date: Aug. 20, 2015

(65) Prior Publication Data
US 2017/0055269 A1 Feb. 23, 2017

(30) Foreign Application Priority Data

Feb. 14, 2014 (JP) .................. 2014-026357

(51) Int. Cl.
*H04W 72/04* (2009.01)
*H04W 76/20* (2018.01)
(Continued)

(52) U.S. Cl.
CPC ....... *H04W 72/0486* (2013.01); *H04W 24/02* (2013.01); *H04W 28/0215* (2013.01);
(Continued)

(58) Field of Classification Search
CPC ............. H04W 72/0486; H04W 24/02; H04W 28/0215; H04W 76/04; H04W 88/12;
(Continued)

(56) References Cited

U.S. PATENT DOCUMENTS 7,415,274 B2 * 8/2008 Kauranen ............. H04W 48/18
455/435.2
8,937,904 B2 * 1/2015 Machida ........... H04W 52/0232
370/328

(Continued)

FOREIGN PATENT DOCUMENTS

CN          103477701 A      12/2013
JP          2012-134708       7/2012
(Continued)

OTHER PUBLICATIONS

"Dynamic" Merriam Webster via Archive.org, https://www.merriam-webster.com/dictionary/dynamic, archived Jan. 22, 2013, pp. 1-3. (Year: 2013).*

(Continued)

*Primary Examiner* — Asad M Nawaz
*Assistant Examiner* — Thomas R Cairns
(74) *Attorney, Agent, or Firm* — Finnegan, Henderson, Farabow, Garrett & Dunner, L.L.P.

(57) ABSTRACT

A technique is provided that makes it possible to diversely control a radio network based on status other than that of the radio network. A network control apparatus according to the present invention includes: a first means for acquiring status related to a second network, which is accessed via a first network which wirelessly transfers data; and a second means for controlling at least one base station of the first network based on the status so as to change a relation of connection between the at least one base station and the second network.

7 Claims, 30 Drawing Sheets

(51) Int. Cl.
*H04W 24/02* (2009.01)
*H04W 28/02* (2009.01)
*H04W 92/04* (2009.01)
*H04W 88/08* (2009.01)
*H04W 88/12* (2009.01)

(52) U.S. Cl.
CPC .......... *H04W 76/20* (2018.02); *H04W 88/085* (2013.01); *H04W 88/12* (2013.01); *H04W 92/04* (2013.01)

(58) Field of Classification Search
CPC ..... H04W 92/04; H04W 76/20; H04W 88/10; H04W 88/085
See application file for complete search history.

(56) References Cited

U.S. PATENT DOCUMENTS

| | | | | |
|---|---|---|---|---|
| 9,125,047 | B2* | 9/2015 | Sundaresan | H04W 16/02 |
| 9,363,689 | B2* | 6/2016 | Ling | H04W 24/02 |
| 2005/0007993 | A1 | 1/2005 | Chambers et al. | |
| 2011/0122779 | A1 | 5/2011 | Meirosu et al. | |
| 2013/0272170 | A1* | 10/2013 | Chatterjee | H04W 28/02 370/280 |
| 2014/0029431 | A1* | 1/2014 | Haberland | H04W 88/08 370/235 |
| 2014/0031049 | A1 | 1/2014 | Sundaresan et al. | |
| 2014/0146797 | A1* | 5/2014 | Zavadsky | H04L 5/0085 370/336 |
| 2017/0064698 | A1* | 3/2017 | Fujinami | H04W 24/02 |

FOREIGN PATENT DOCUMENTS

| | | |
|---|---|---|
| JP | 2013-511888 | 4/2013 |
| WO | WO 2013/059128 A1 | 4/2013 |

OTHER PUBLICATIONS

S. Namba et al., "Colony-RAN Architecture for Future Cellular Network", Future Network & Mobile Summit (FutureNetw), Jul. 2012.

S. Kuwano et al., "Optical Access Technologies for Mobile Radio Access Network", IEICE Technical Report, LQE, Lasers and Quantam Electronics 112 (400), Jan. 2013.

Nokia Siemens Networks et al., "HeNB's S1 simplification by means of HeNB GW", 3GPP TSG RAN WG3 Meeting #59, R3-080155, Feb. 2008.

International Search Report and Written Opinion dated May 19, 2015, in corresponding PCT International Application.

Karthikeyan Sundaresan et al., "FluidNet: A Flexible Cloud-based Radio Access Network for Small Cells", Proceedings of the 19th Annual International Conference on Mobile Computing & Networking, Mobicon '13, Sep. 30, 2013, pp. 99-110, XP055256070.

Extended European Search Report for counterpart European Patent Application No. 15748937.8 dated Jul. 25, 2017.

Office Action issued by the Chinese Patent Office in counterpart Chinese Patent Application No. 201580008728.1 dated Nov. 23, 2018.

* cited by examiner

NETWORK CONTROL APPARATUS, COMMUNICATION APPARATUS, NETWORK CONTROL METHOD, COMMUNICATION METHOD, COMMUNICATION SYSTEM, AND PROGRAM

CROSS-REFERENCE TO RELATED PATENT APPLICATIONS

This application is a National Stage Entry of International Application No. PCT/JP2015/000675, filed Feb. 13, 2015, which claims priority from Japanese Patent Application No. 2014-026357, filed Feb. 14, 2014. The entire contents of the above-referenced applications are expressly incorporated herein by reference.

TECHNICAL FIELD

The present invention is based upon and claims the benefit of priority from Japanese Patent Application No. 2014-026357, filed on Feb. 14, 2014, the disclosure of which is incorporated herein in its entirety by reference.

The present invention relates to a radio network, and more particularly to control of equipment in a radio network.

BACKGROUND ART

PTL 1 discloses a communication system in which a radio section (RRH: Remote Radio Head) and a baseband processing section (BBU: Base Band Unit) are separated.

PTL 1 discloses a technique for controlling the equipment (radio sections and baseband sections) in a radio network (RAN: Radio Access Network) based on parameters related the radio network (the radio sections' and the baseband processing sections' operating rates). More specifically, the relation of connection between a radio section and a baseband section is changed based on the operating rates of the radio sections and the baseband processing sections.

CITATION LIST

Non Patent Literature

[PTL 1]
Japanese Patent Application Unexamined Publication No. 2012-134708

SUMMARY

Technical Problem

However, according to the technique of PTL 1, since the radio network is controlled based on the parameters related to the radio network, it is difficult to control the radio network diversely based on other parameters, i.e., parameters indicating other status than that of the radio network.

Accordingly, an object of the present invention is to provide a technique for controlling a radio network based on various parameters.

Solution to Problem

A network control apparatus of the present invention includes: a first means for acquiring status related to a second network, which is accessed via a first network, which wirelessly transmits data; and a second means for controlling base stations in the first network based on the status so that a relation of connection between at least one of the base stations and the second network will be changed.

A communication apparatus of the present invention is a communication apparatus included in a first network, which wirelessly transmits data, and includes: an interface communicating with a network control apparatus, which is capable of controlling the communication apparatus based on status of a second network, which is accessed via the first network; and a communication means capable of changing another end of communication of the communication apparatus, based on an instruction from the network control apparatus received via the interface, so that a relation of connection between the first network and the second network will be changed.

A network control method of the present invention includes: acquiring status of a second network, which is accessed via a first network, which wirelessly transmits data; and controlling base stations in the first network based on the status so that a relation of connection between at least one of the base stations and the second network will be changed.

A communication method of the present invention is a communication method by a communication apparatus included in a first network, which wirelessly transmits data, and includes: communicating with a network control apparatus, which is capable of controlling the communication apparatus based on status of a second network, which is accessed via the first network; and changing another end of communication of the communication apparatus, based on an instruction from the network control apparatus received via the interface, so that a relation of connection between the first network and the second network will be changed.

A communication system of the present invention is a communication system including base stations, and includes: a first means for acquiring status of a second network, which is accessed via a first network, which wirelessly transmits data; and a second means for controlling base stations in the first network based on the status so that a relation of connection between at least one of the base stations and the second network will be changed.

A program of the present invention causes a computer to execute: processing for acquiring status of a second network, which is accessed via a first network, which wirelessly transmits data; and processing for controlling base stations in the first network based on the status so that a relation of connection between at least one of the base stations and the second network will be changed.

Advantageous Effects of Invention

According to the present invention, it is possible to provide a technique for controlling a radio network based on various parameters.

DETAILED DESCRIPTION

Hereinafter, embodiments of the present invention will be described. Each embodiment is shown for illustration, and the present invention is not limited to each embodiment.

1. First Exemplary Embodiment 1.1) Outline

Hereinafter, it is assumed that a communication system includes a multi-layer network composed of a radio network such as RAN, a backhaul network, a core network, and the like. In such a communication system, there is a possibility that the communication characteristics or performance of a network at each layer is affected by the communication characteristics or performance of another network. For example, to improve the communication characteristics or performance of the radio network, even if equipment at this layer is controlled based on a parameter related to the radio network, expected communication characteristics or performance may possibly not be obtained due to effects of a network at another layer.

Accordingly, in the communication system according to a first exemplary embodiment of the present invention, a control apparatus controls equipment in the radio network, also taking consideration of a parameter indicating status other than that of the radio network, allowing the possibility of obtaining the expected communication characteristics or performance of the radio network to be increased. Note that the control apparatus can be implemented by using, for example, a SON (Self Organizing Network) server or the like.

First Example

Figure 1:
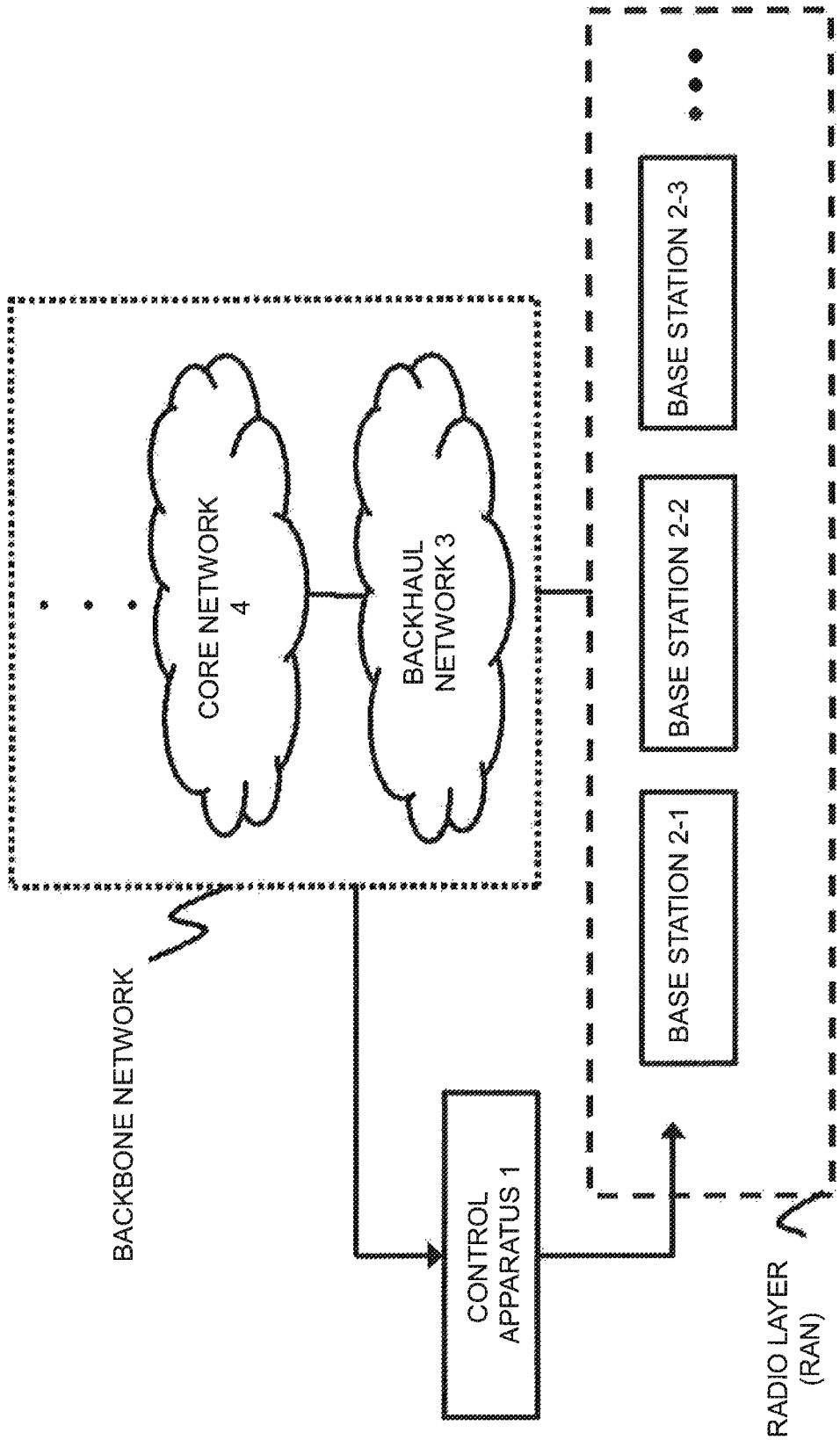
FIG. 1 is a system architecture diagram showing an example of a communication system according to a first exemplary embodiment of the present invention.

As illustrated in FIG. 1, a control apparatus 1 controls base stations 2 based on the status (e.g., congestion status, or any other parameter) of a backbone network including a backhaul network 3, a core network 4, and the like. As an example, in a case where a base station 2 is connected to the backbone network where congestion is occurring, the control apparatus 1 causes a mobile terminal under the base station 2 to be handed over to another base station 2. It is also possible to control the base stations 2 based on not only the congestion status of the backbone network but also another parameter.

Second Example

Figure 2:
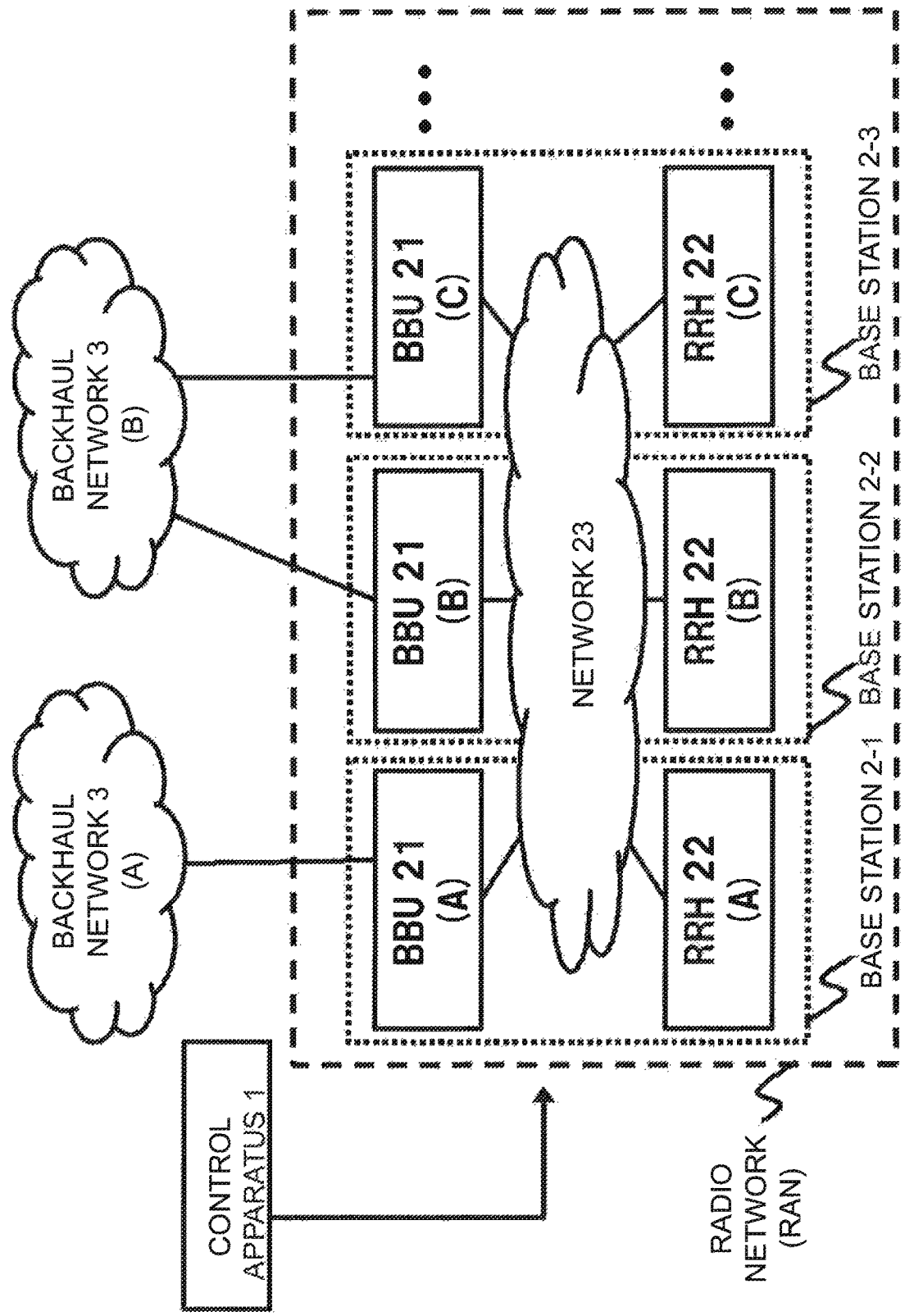
FIG. 2 is a system architecture diagram showing another example of the communication system according to the first exemplary embodiment.

FIG. 2 shows another example of the system architecture of the first exemplary embodiment. In the system shown in FIG. 2, a function of processing digital baseband signals and a function of processing analog radio frequency (RF: Radio Frequency) signals included in a base station 2 are separated into a baseband processing section 21 (hereinafter, BBU 21)

and a radio section 22 (hereinafter, RRH 22), which are connected to each other via a network 23.

It is also possible that the BBU 21 is configured by using a virtual machine (VM: Virtual Machine) operating on a computer.

The BBU 21 is connected to an upper network (e.g., a carrier's backhaul network, a core network, or the like) and performs control and monitoring of a radio base station and digital baseband signal processing. The digital baseband signal processing includes layer-2 signal processing and layer-1 (physical layer) signal processing. The layer-2 signal processing includes at least one of (i) data compression/decompression, (ii) data encryption, (iii) addition/deletion of a layer-2 header, (iv) data segmentation/concatenation, and (v) composition/decomposition of a forwarding format through data multiplexing/demultiplexing. In case of E-UTRA as a specific example, the layer-2 signal processing includes Radio Link Control (RLC) and Media Access Control (MAC) processing. The physical layer signal processing includes channel coding/decoding, modulation/de-modulation, spreading/de-spreading, resource mapping, generation of OFDM symbol data (a baseband OFDM signal) through Inverse Fast Fourier Transform (IFFT), and the like.

The RRH 22 is in charge of analog RF signal processing and provides an air interface to a mobile station. The analog RF signal processing includes D/A (Digital to analog) conversion, A/D (Analog to Digital) conversion, frequency up-conversion, frequency down-conversion, amplification, and the like.

In the system illustrated in FIG. 2, it is conceivable that backhaul networks 3 vary with BBUs 21. For example, in the example of FIG. 2, a BBU 21(A) is connected to a backhaul network 3(A), and BBUs 21(B) and (C) are connected to a backhaul network 3(B).

For example, the control apparatus 1 changes a BBU 21 for an RRH 22 to connect to, based on the congestion status of a backhaul network 3. For example, when an RRH 22(A) is connected to the BBU 21(A), the control apparatus 1 changes the target for the RRH 22(A) to connect to from the BBU 21(A) to the BBU 21(B) based on the congestion status of the backhaul network 3(A). The control apparatus 1 can control the radio network based on not only the congestion status of a backhaul network but also another backhaul network-related parameter.

1.2) Control Apparatus

Figure 3:
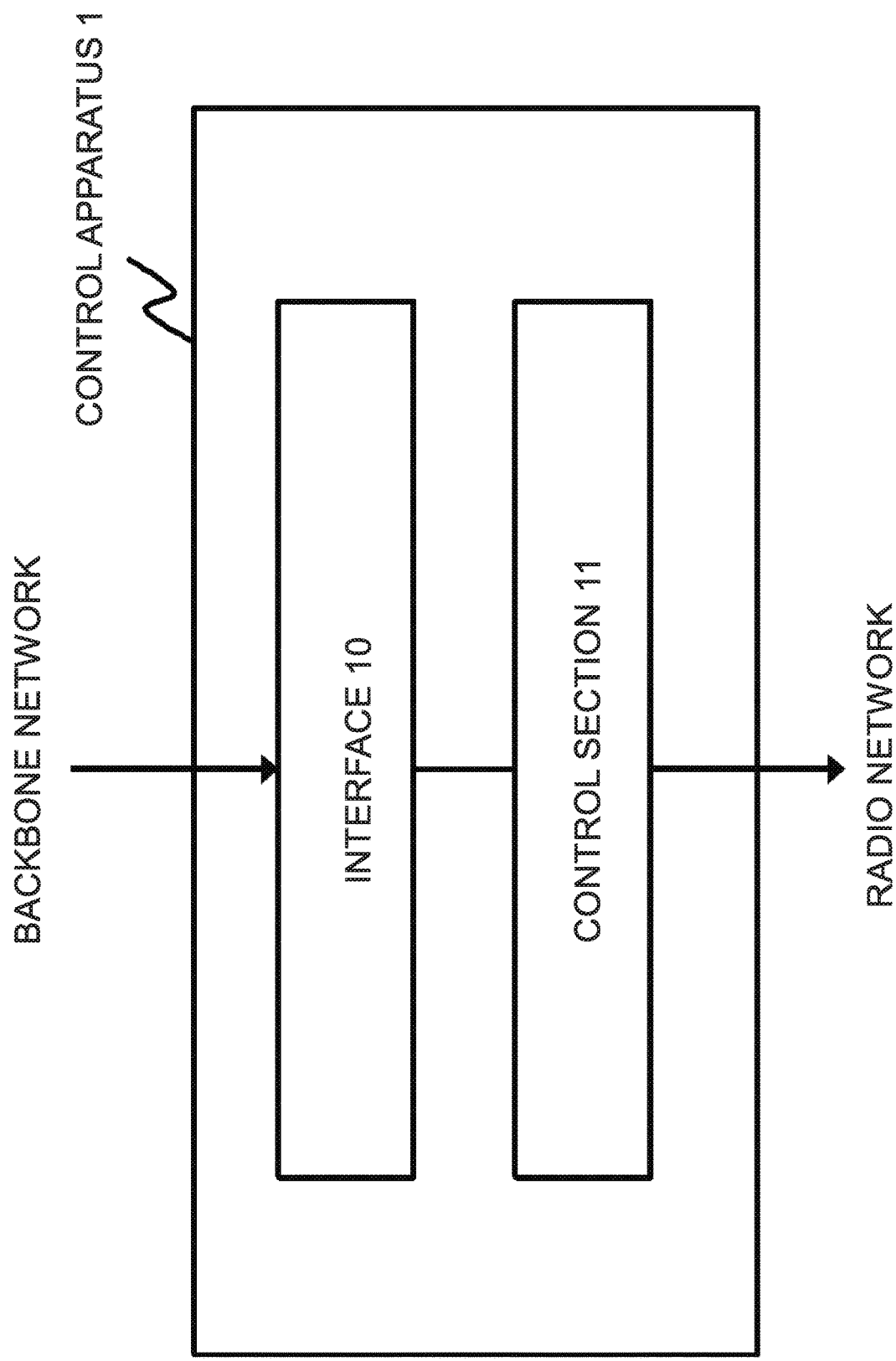
FIG. 3 is a schematic block diagram showing an example of the configuration of a control apparatus according to the first exemplary embodiment.

FIG. 3 shows an example of the configuration of the control apparatus 1. The control apparatus 1 includes an interface 10 and a control section 11.

In the control apparatus 1, the status of the backbone network, which is accessed via the radio network, is acquired via the interface 10. That is, the control apparatus 1 acquires a parameter (e.g., a parameter related to congestion status) for use in control of the radio network, as the status of the backbone network, via the interface 10 with the backbone network. The control section 11 controls the radio network based on the parameter acquired via the interface 10. For example, the control section 11 controls base stations in the radio network based on the parameter so that the relation of connection between at least one of the base stations and the backbone network will be changed.

For example, the control section 11 can give an instruction for handover control to a base station, based on the parameter acquired via the interface 10. For example, the control section 11, based on the congestion status of the backbone network, determines a handover-target base station 2 (target base station) and instructs a handover-source base station 2 (source base station) to perform handover to the target base station.

Moreover, for at least one of the BBUs 21 and at least one of the RRHs 22 in the radio network, the control section 11 can change the relation of connection between a BBU 21 and an RRH 22 based on the parameter acquired via the interface 10. For example, the control section 11 instructs the RRH 22 to change the address of a destination BBU 21, and instructs the BBU 21 to change the address of a destination RRH 22. Each of the BBU 21 and RRH 22 sends communication data to the destination instructed by the control section 11 via the network 23.

With the above-described functions, the control section 11 can control the base stations (including the BBUs 21 and RRHs 22) so as to suppress degradation in the communication performance between the radio network and the backbone network.

Figure 4:
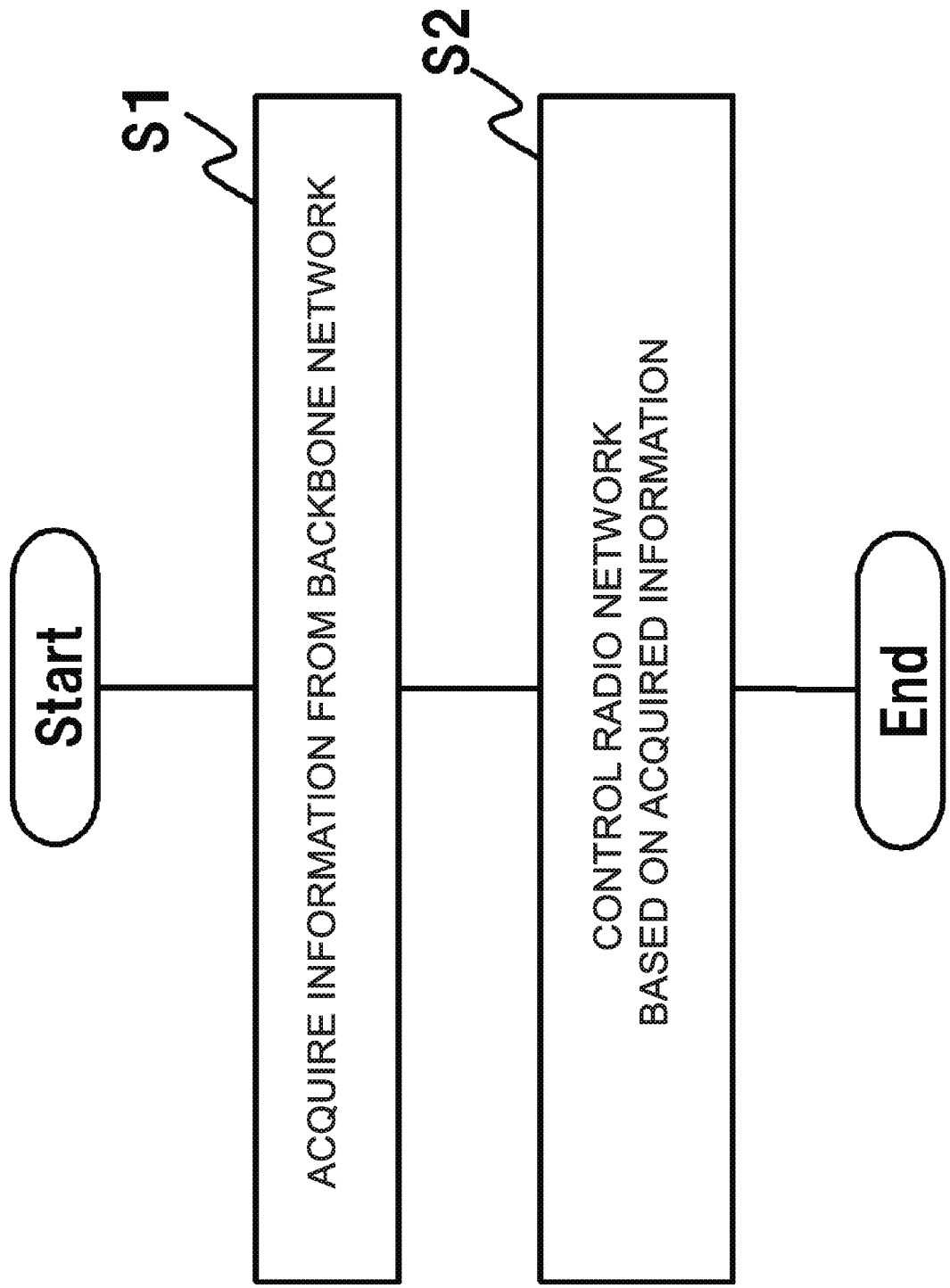
FIG. 4 is a flowchart showing an example of operation of the control apparatus according to the first exemplary embodiment.

FIG. 4 is a flowchart showing an example of operation of the control apparatus 1. The control apparatus 1 acquires information from the backbone network via the interface 10 (Operation S1). The acquired information is a parameter related to the congestion status of the backbone network as in the above-described example.

The control section 11 controls the radio network based on the information acquired via the interface 10 (Operation S2). The control section 11 instructs a base station 2 to perform handover based on the parameter related to the congestion status of the backbone network, as in the above-described example. For example, the control section 11 changes a connection between a BBU 21 and an RRH 22 based on the parameter related to the congestion status of the backbone network as described above.

2. Second Exemplary Embodiment

According to a second exemplary embodiment of the present invention, a control apparatus 1 can control a radio network based on various parameters. For example, the control apparatus 1 can control the radio network based on the status of the entire network. Note that the second exemplary embodiment is applicable to the above-described first exemplary embodiment.

2.1) System (First Example)

Figure 5:
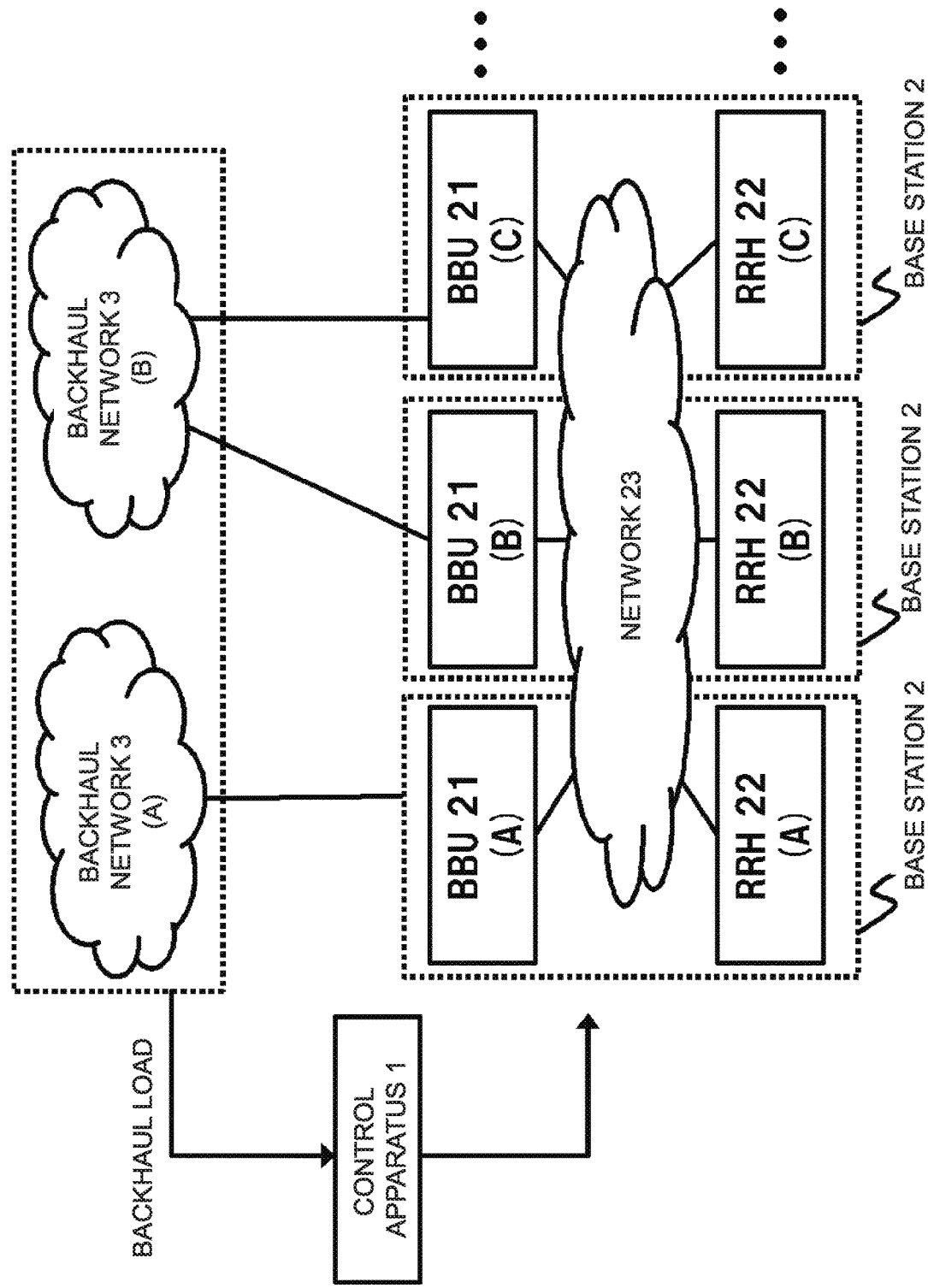
FIG. 5 is a system architecture diagram showing an example of a communication system according to a second exemplary embodiment of the present invention.

FIG. 5 shows an example of the architecture of a system according to the second exemplary embodiment. The control apparatus 1 according to the present exemplary embodiment controls the radio network based on a parameter related to backhaul networks 3. In the example of FIG. 5, the control apparatus 1 controls the radio network based on a parameter related to the loads on the backhaul networks 3, but it is also possible to use a parameter other than the loads on the backhaul networks 3. For example, the control apparatus 1 can also control the radio network based on the communication bandwidths of the backhaul networks 3, the types of communication media used in the backhaul networks 3, or the like. The type of a communication medium may be, for instance, an optical network link, a radio network link, or the like.

The control apparatus 1 acquires the parameter via the interface 10 with the backhaul networks 3. The control section 11 of the control apparatus 1 controls the radio network based on the acquired parameter.

The control section 11 changes a BBU 21 for an RRH 22 to connect to, based on the load status of the backhaul networks 3. For example, the control section 11 switches an RRH 22 that is connected to a BBU 21 corresponding to a backhaul under a load higher than a predetermined threshold, to a BBU 21 corresponding to a backhaul under a load lower than a predetermined threshold.

Figure 6:
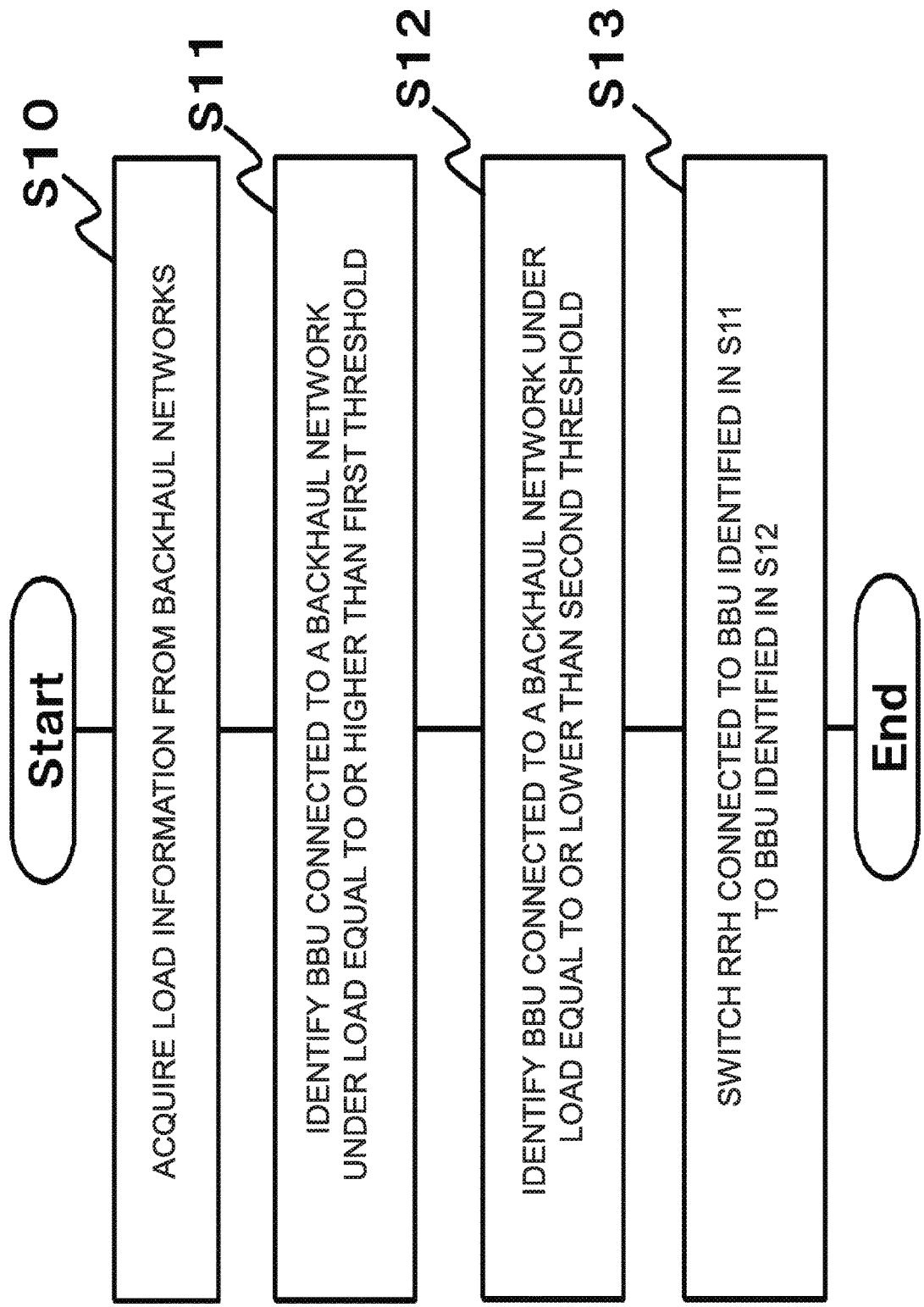
FIG. 6 is a flowchart showing an example of operation of a control apparatus according to the second exemplary embodiment.

A flowchart of FIG. 6 shows an example of operation for the control section 11 to switch a connection between an RRH 22 and a BBU 21.

The control apparatus 1 acquires load information on the backhaul networks 3 via the interface 10 (Operation S10). The load information is, for example, communication volume, throughput, or the like. For example, the control apparatus 1 acquires the load information from network nodes (switches, routers, and the like) included in the backhaul networks 3.

The control section 11 identifies a backhaul network 3 under a load equal to or higher than a first threshold based on the acquired load information, and identifies a BBU 21 connected to the identified backhaul network 3 (Operation S11). For example, the control section 11 has information indicating correspondences between the backhaul networks 3 and the BBUs 21 and, based on this information, identifies a BBU 21 connected to the identified backhaul network 3.

The control section 11 identifies a backhaul network 3 under a load equal to or lower than a second threshold based on the acquired load information, and identifies a BBU 21 connected to the identified backhaul network 3 (Operation S12). The control section 11 switches an RRH 22 connected to the BBU 21 identified in Operation S11 to the BBU 21 identified in Operation S12 (Operation 513). The control section 11 may switch the connection of at least one of RRHs 22 connected to the BBU 21 identified in Operation S11. Moreover, the control section 11 may switch the connections of all RRHs 22 connected to the BBU 21 identified in Operation S11.

The operation shown in the above-described flowchart is an example, and operation of the control apparatus 1 is not limited to the example shown in FIG. 6.

For example, it is also possible that the control section 11 changes a BBU for an RRH 22 to connect to, from a BBU connected to a backhaul whose communication bandwidth is equal to or narrower than a predetermined threshold to a BBU connected to a backhaul whose communication bandwidth is equal to or wider than a predetermined threshold.

For example, it is also possible that the control section 11 compares the allowable communication bandwidth of a backhaul with the total of the communication volumes of a plurality of RRHs/BBUs connected to this backhaul and, if the total of the communication volumes exceeds a threshold for the allowable communication bandwidth (e.g., 80% of the allowable communication bandwidth) of the backhaul, then switches part of the RRHs to BBUs corresponding to another backhaul. Alternatively, the control section 11 may change a BBU for an RRH 22 to connect to, based on the types of communication media in backhauls.

2.2) System (Second Example)

Figure 7:
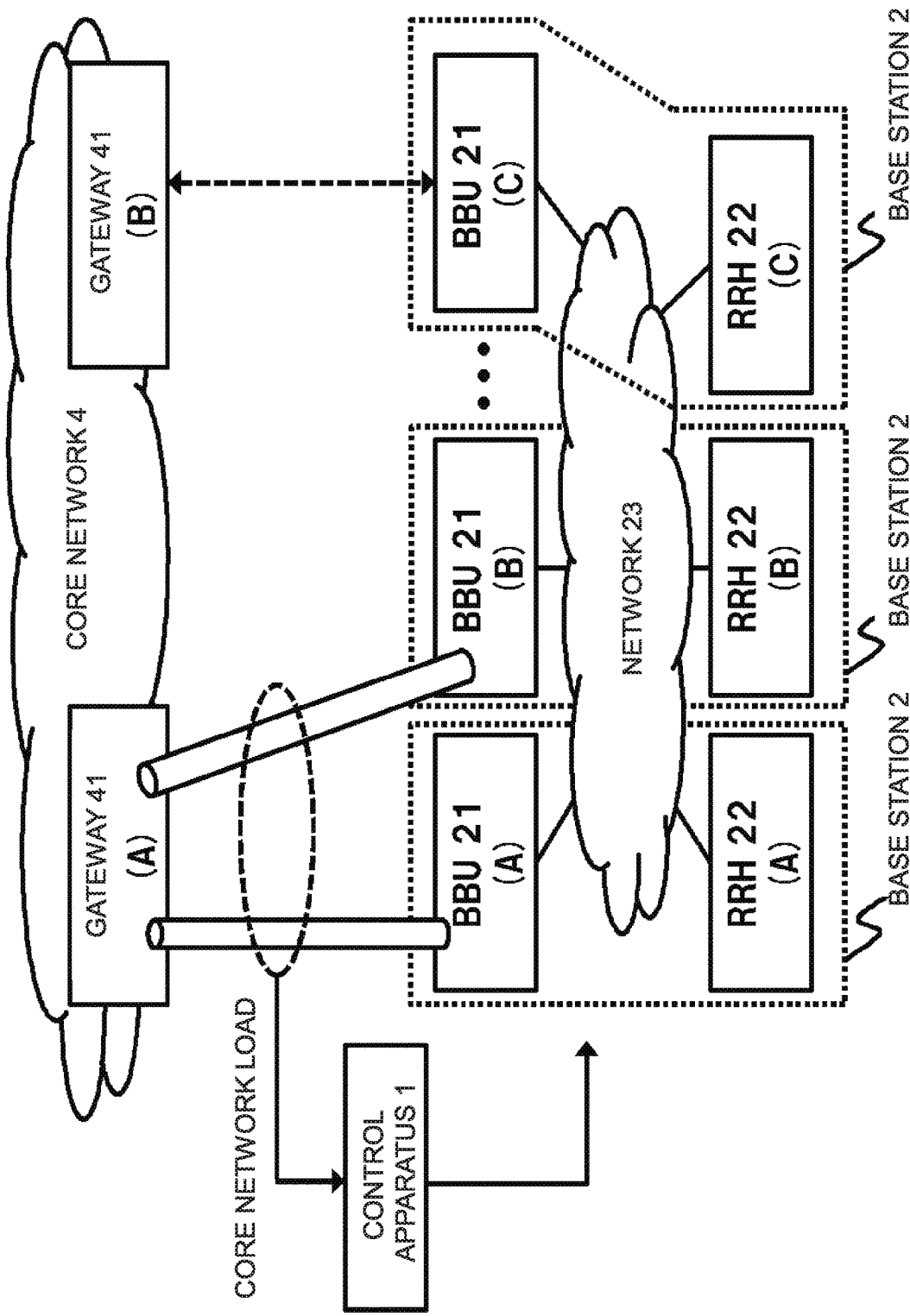
FIG. 7 is a system architecture diagram showing an example of the communication system according to the second exemplary embodiment.

FIG. 7 shows another example of the architecture of the system according to the second exemplary embodiment, and the control apparatus 1 controls the radio network based on a parameter related to a core network 4. In the example of FIG. 7, the control apparatus 1 controls the radio network based on a parameter related to the load on the core network 4, but it is also possible to use a parameter other than the load on the core network 4. For example, the control apparatus 1 can also control the radio network based on the communication bandwidth of the core network 4, the type of communication operator that operate the core network 4, or the like. The control apparatus 1 acquires the parameter via the interface 10 with the core network 4.

The control section 11 changes a BBU 21 for an RRH 22 to connect to, based on the load statuses of core networks 4. For example, the control section 11 switches an RRH 22 that is connected to a BBU 21 corresponding to a core network under a load higher than a predetermined threshold, to a BBU 21 corresponding to a core network under a load lower than a predetermined threshold. The control section 11 may instruct a BBU 21 to change a network node (e.g., a gateway 41 or the like in FIG. 7) in the core network 4, based on the load statuses of the core networks 4. Each BBU 21 can change a network node to connect to, based on an instruction from the control section 11.

Figure 8:
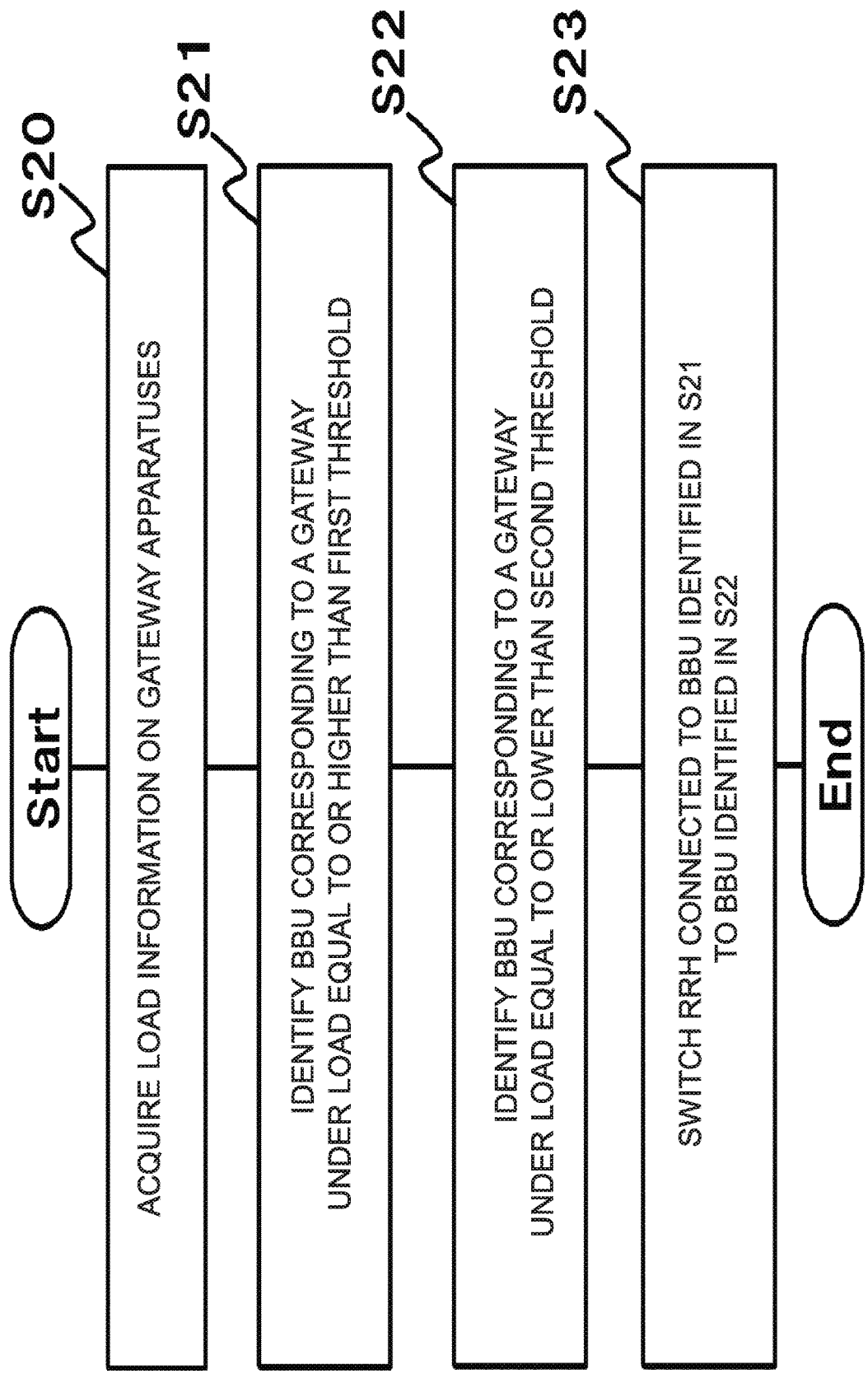
FIG. 8 is a flowchart showing an example of operation of the control apparatus according to the second exemplary embodiment.

A flowchart of FIG. 8 shows an example of operation for the control section 11 to switch a connection between an RRH 22 and a BBU 21. The control apparatus 1 acquires load information on the core network 4 via the interface 10 (Operation S20). The load information is, for example, communication volume, throughput, the number of bearers configured with gateways 41, or the like. For example, the control apparatus 1 acquires the load information from network nodes (gateways 41 and the like in FIG. 7) included in the core network 4.

The control section 11 identifies a gateway 41 under a load equal to or higher than a first threshold based on the acquired load information, and identifies a BBU 21 connected to the identified gateway 41 (Operation S21). For example, the control section 11 has information indicating correspondences between the gateways 41 and the BBUs 21 and, based on this information, identifies a BBU 21 connected to the identified gateway 41.

The control section 11 identifies a gateway 41 under a load equal to or lower than a second threshold based on the acquired load information, and identifies a BBU 21 connected to the identified gateway 41 (Operation S22).

The control section 11 switches an RRH 22 connected to the BBU 21 identified in Operation S21 to the BBU 21 identified in Operation S22 (Operation S23). The control section 11 may switch the connection of at least one of RRHs 22 connected to the BBU 21 identified in Operation S21. Moreover, the control section 11 may switch the connections of all RRHs 22 connected to the BBU 21 identified in Operation S21.

Note that operation of the control apparatus 1 is not limited to the example shown in FIG. 8. For example, it is also possible that the control section 11 changes a BBU for an RRH 22 to connect to, from a BBU corresponding to a gateway whose communication bandwidth is equal to or narrower than a predetermined threshold to a BBU corresponding to a gateway whose communication bandwidth is equal to or wider than a predetermined threshold. Moreover, for example, the control section 11 may change a BBU for an RRH 22 to connect to, based on the types of communication operators that operate the core network 4.

2.3) System (Third Example)

Figure 9:
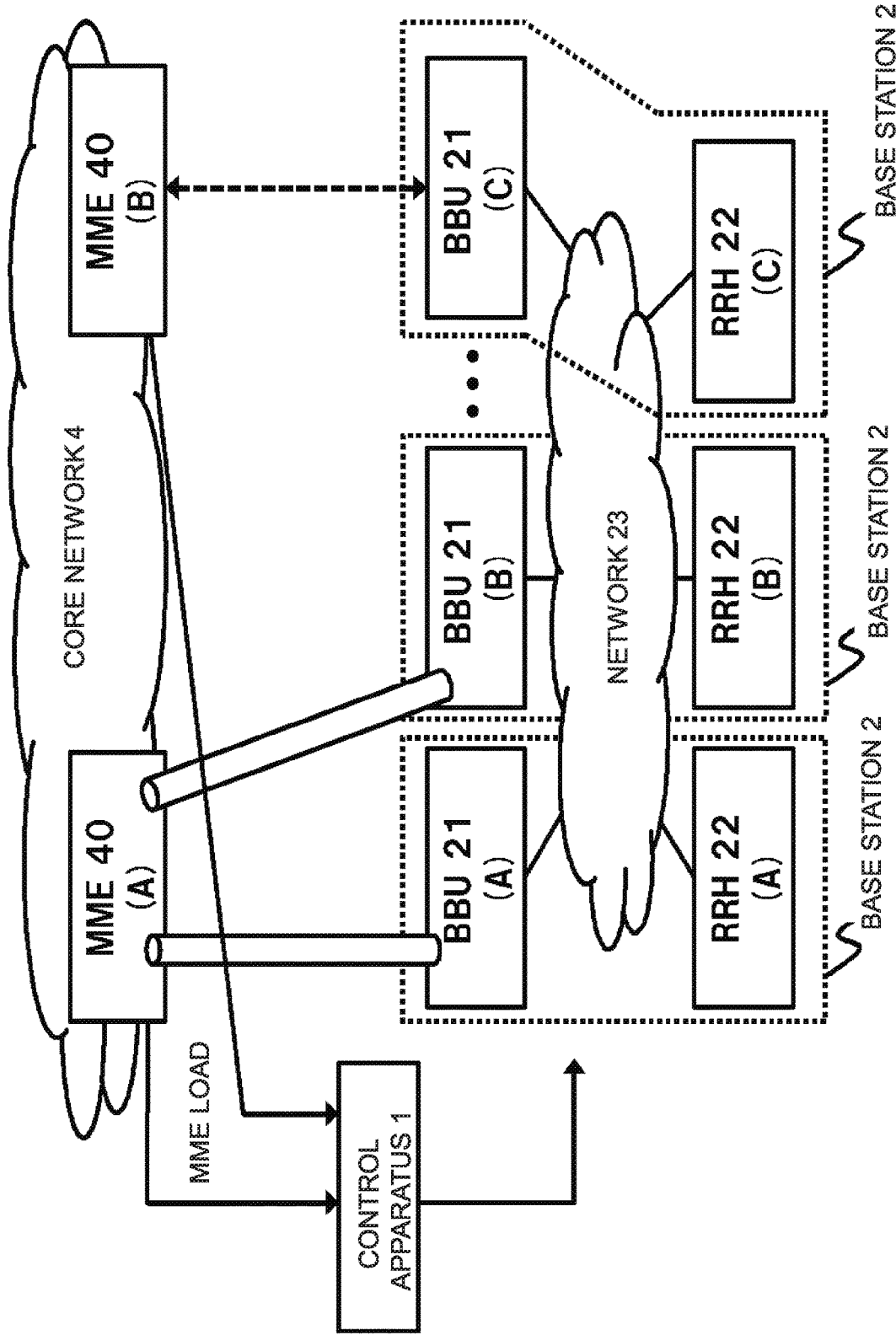
FIG. 9 is a system architecture diagram showing another example of the system architecture of the communication system according to the second exemplary embodiment.

FIG. 9 shows another example of the architecture according to the second exemplary embodiment, and the control apparatus 1 uses the loads on MMEs (Mobility Management Entities) 40 for a parameter related to a core network 4. The MMEs 40 are control nodes of LTE (Long Term Evolution)

system and manage terminal authentication processing, handover between base stations, and the like.

The control apparatus 1 acquires the loads on the MMEs 40 via the interface 10 with the core network 4. The interface 10 may be an interface configured with each MME 40, or may be an interface configured with an apparatus that can acquire load information from the MMEs 40.

The control section 11 changes a BBU 21 for an RRH 22 to connect to, based on the load statuses of the MMEs 40. For example, the control section 11 switches an RRH 22 that is connected to a BBU 21 corresponding to an MME under a load higher than a predetermined threshold, to a BBU 21 corresponding to an MME under a load lower than a predetermined threshold.

The control section 11 may instruct a BBU 21 to change an MME 40, based on the load status of the MMEs 40. Each BBU 21 can change a MME 40 to connect to, based on an instruction from the control section 11.

FIG. 9 shows an example in which the control apparatus 1 and MMEs 40 are discrete apparatuses. However, it is also possible that the MMEs 40 have the functions of the control apparatus 1. In this case, each MME 40 controls the relation of connection between an RRH 22 and a BBU 21. Moreover, it is also possible that a SON (Self Organizing Network) server has the functions of the control apparatus 1. In this case, the SON server controls the relation of connection between a BBU 21 and an RRH 22, based on the MME loads.

Figure 10:
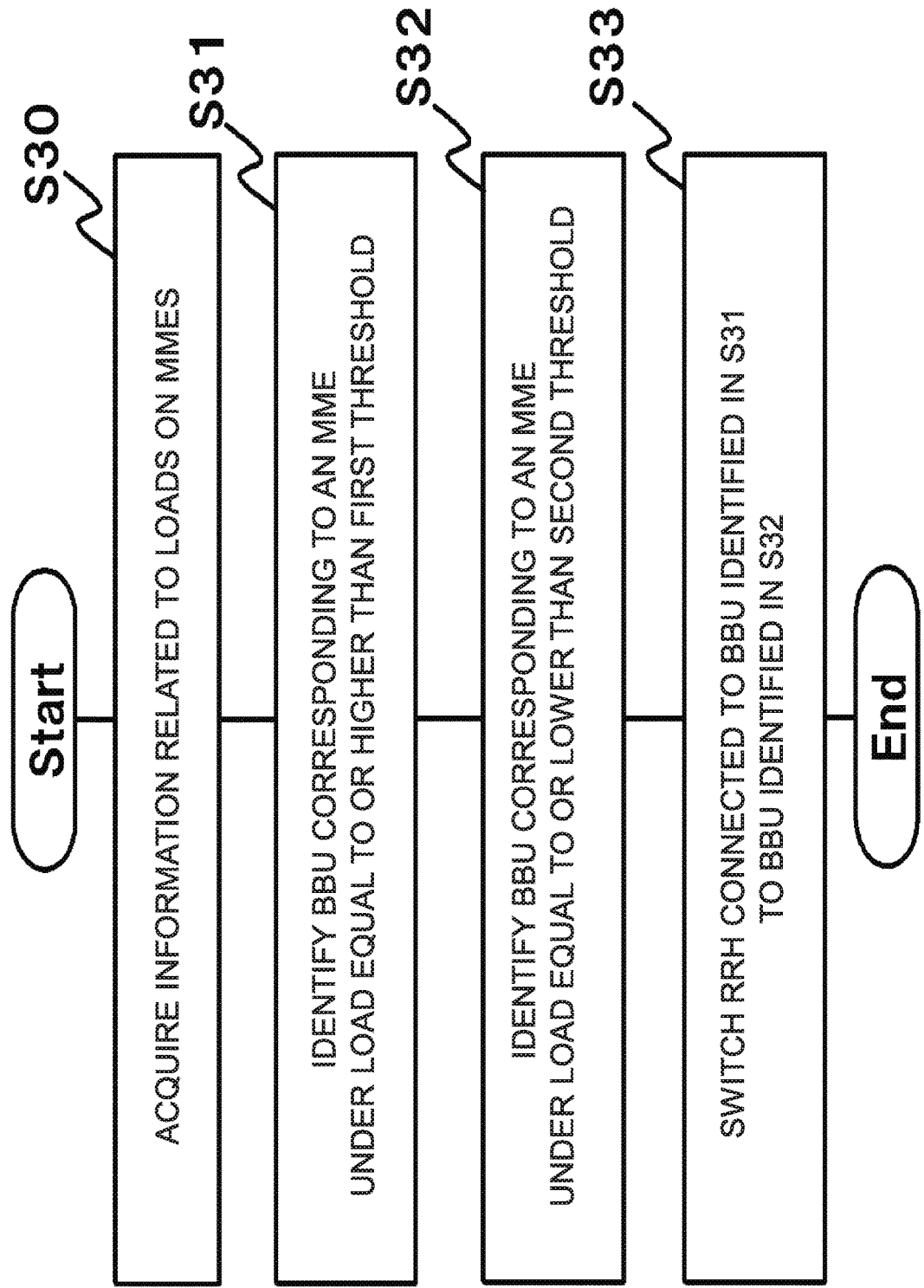
FIG. 10 is a flowchart showing an example of operation of the control apparatus according to the second exemplary embodiment.

A flowchart of FIG. 10 shows an example of operation for the control section 11 to switch a connection between an RRH 22 and a BBU 21.

The control apparatus 1 acquires load information on the MMEs 40 via the interface 10 (Operation S30). The load information on the MMEs 40 is, for example, the operational load on each MME 40, the number of SCTP (Stream Control Transmission Protocol) sessions established between base stations (or BBUs 21) and each MME 40, or the like.

The control section 11 identifies an MME 40 under a load equal to or higher than a first threshold based on the acquired load information, and identifies a BBU 21 connected to the identified MME 40 (Operation S31). For example, the control section 11 has information indicating correspondences between the MMEs 40 and the BBUs 21 and, based on this information, identifies a BBU 21 connected to the identified MME 40.

The control section 11 identifies an MME 40 under a load equal to or lower than a second threshold based on the acquired load information, and identifies a BBU 21 connected to the identified MME 40 (Operation S32).

The control section 11 switches an RRH 22 connected to the BBU 21 identified in Operation S31 to the BBU 21 identified in Operation S32 (Operation S33). The control section 11 may switch the connection of at least one of RRHs 22 connected to the BBU 21 identified in Operation S31. Moreover, the control section 11 may switch the connections of all RRHs 22 connected to the BBU 21 identified in Operation S31.

In the second exemplary embodiment, examples are shown in which the control apparatus 1 changes the relation of connection between a BBU 21 and an RRH 22. However, it is also possible that the control apparatus 1 controls handover by base stations 2, based on the status of backhaul networks 3 or core network 4.

3. Third Exemplary Embodiment

A third exemplary embodiment of the present invention shows examples of the configuration of a radio network apparatus that is controlled by a control apparatus 1. The third exemplary embodiment is applicable to any of the above-described first and second exemplary embodiments.

Figure 11:
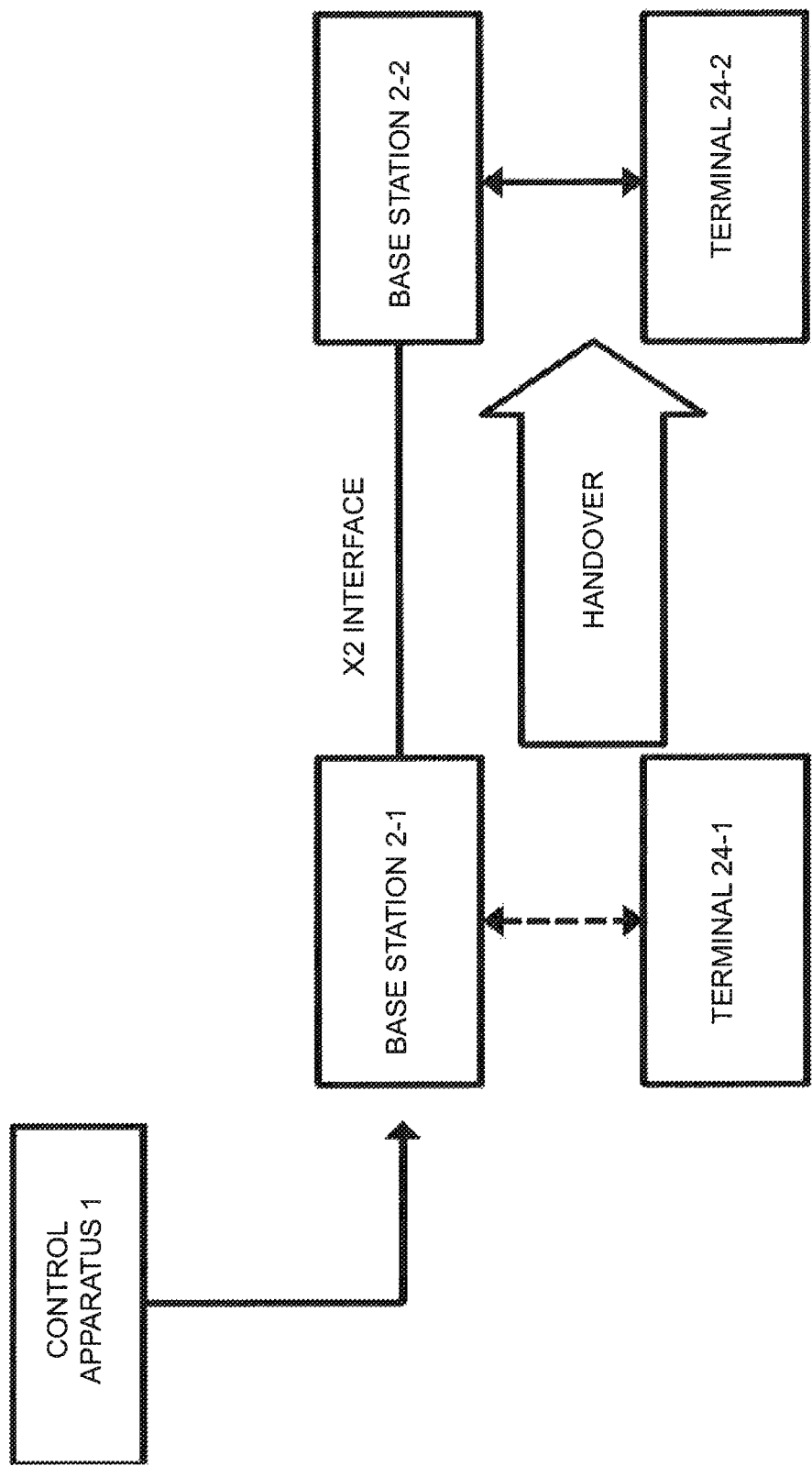
FIG. 11 is a system architecture diagram showing a first example of a communication system according to a third exemplary embodiment of the present invention.

FIG. 11 shows an example in which a base station 2 performs handover based on the control of the control apparatus 1. The base station 2 performs handover of a terminal 24 via an X2 interface configured with another base station 2, in response to an instruction from the control apparatus 1.

3.1) Base Station

Figure 12:
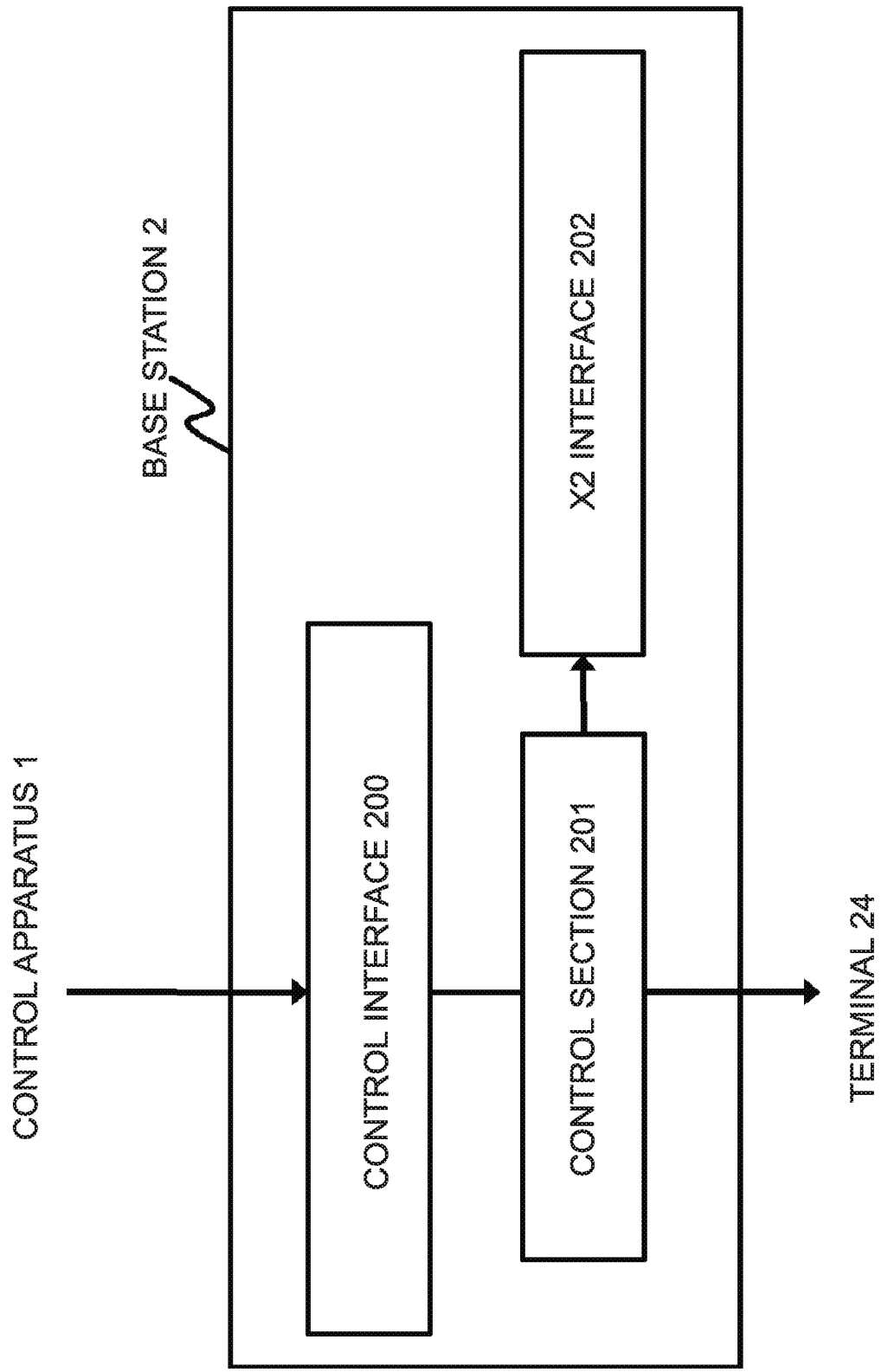
FIG. 12 is a block diagram showing an example of the configuration of a base station in the third exemplary embodiment.

FIG. 12 shows an example of the configuration of the base station 2 illustrated in FIG. 11. The base station 2 includes a control interface 200, a control section 201, and an X2 interface 202. The control section 201 of the base station 2 is controlled by the control apparatus 1 via the control interface 200. The X2 interface 202 is an interface configured with another base station 2.

The control apparatus 1 controls the base station 2 via the control interface 200. The control apparatus 1 controls the base station 2 based on the status of a network that is different from the radio network. The control apparatus 1 can instruct the base station 2 to perform handover, based on any parameter illustrated in the first or second exemplary embodiment. As an example, the control apparatus 1 instructs the base station 2 connected to a backhaul network 3 under a high load to perform handover to another base station 2 (a base station connected to a backhaul network 3 under a lower load).

The control section 201 sends a handover request to another base station 2 via the X2 interface 202, based on the instruction from the control apparatus 1. The control section 201 instructs a terminal 24 to be handed over, in response to a handover response (ACK) from the other base station 2. The terminal 24 performs processing for connecting to the other base station 2 indicated by the control section 201.

3.2) Radio Network

Next, a description will be given of an example of the configuration of a radio network apparatus in case where the control apparatus 1 changes the relation of connection between a BBU 21 and an RRH 22.

Figure 13:
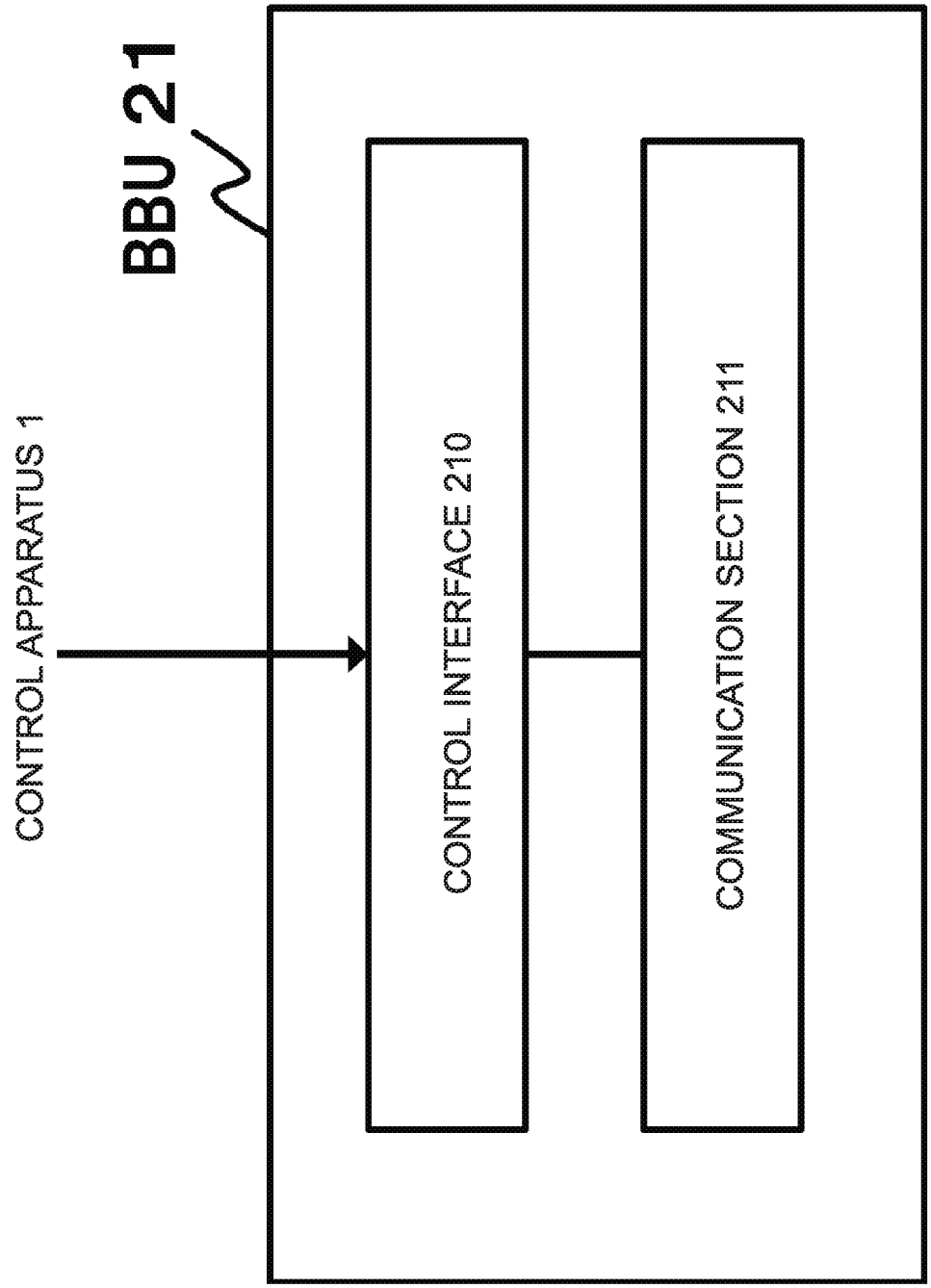
FIG. 13 is a block diagram showing an example of the configuration of a BBU in the third exemplary embodiment.
Figure 14:
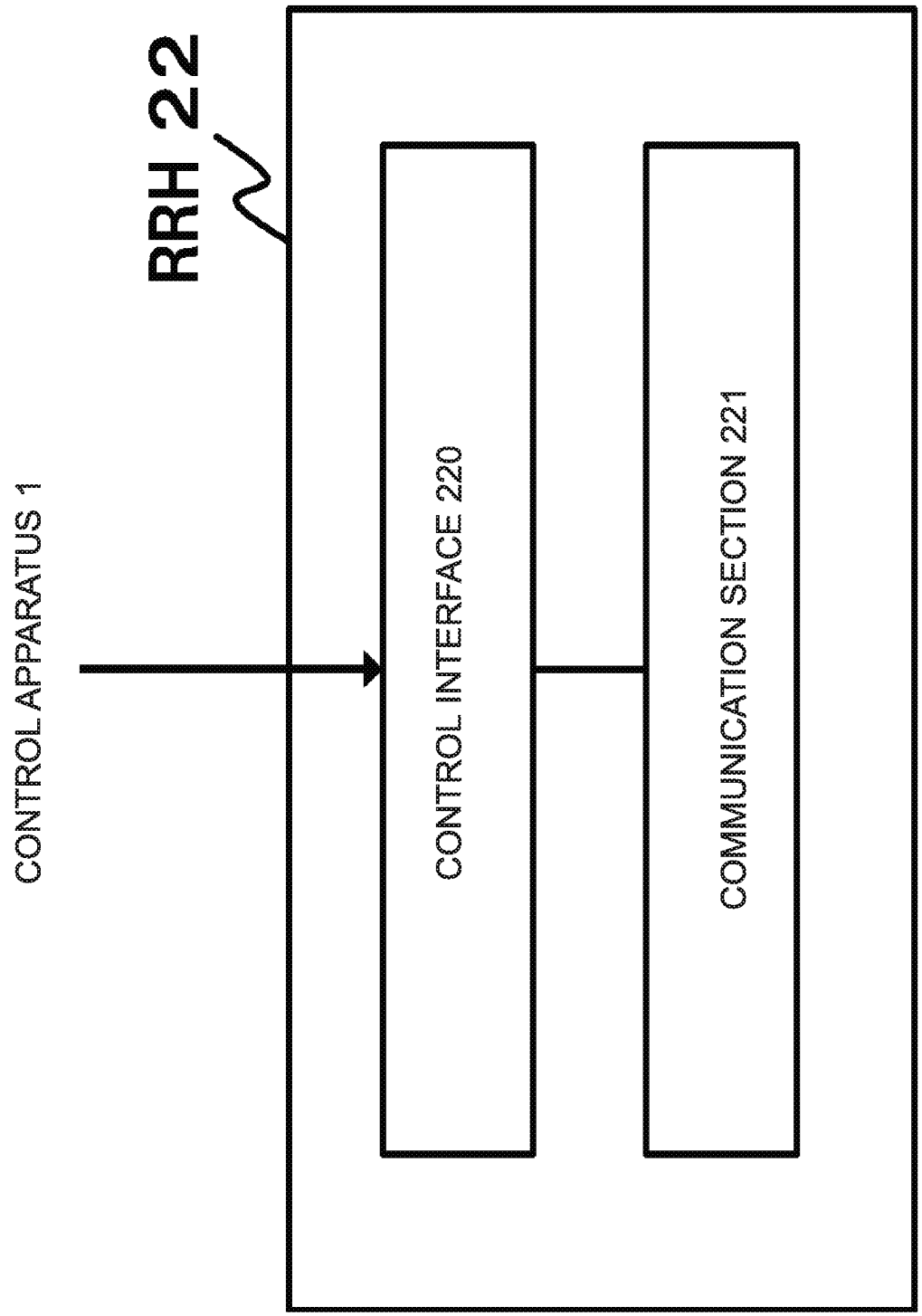
FIG. 14 is a block diagram showing an example of the configuration of an RRH in the third exemplary embodiment.

FIGS. 13 and 14 show examples of the configurations of a BBU 21 and an RRH 22, respectively. The BBU 21 and RRH 22 illustrated in FIGS. 13 and 14, respectively, each can change the other party of its connection, based on the control of the control apparatus 1.

FIG. 13 shows an example of the configuration of the BBU 21. The BBU 21 includes a control interface 210 and a communication section 211. The BBU 21 is controlled by the control apparatus 1 via the control interface 210.

The control apparatus 1 controls the BBU 21 based on the status of a network that is different from the radio network. For example, the control apparatus 1 instructs the BBU 21 to change the relation of connection with an RRH 22, based on any of the parameters illustrated in the first and second exemplary embodiments.

The communication section 211 changes a connection link with an RRH 22, based on the instruction from the control apparatus 1. CPRI (Common Public Radio Interface) is defined as a protocol related to a connection link between a BBU 21 and an RRH 22. For example, the communication section 211 can constitute a connection link with an RRH 22, based on the CPRI standards. CPRI prescribes that a layer-2 protocol such as Ethernet™ can be used for a connection link between a BBU 21 and an RRH 22. In the example of FIG. 13, the communication section 211 establishes a connection link with an RRH 22, based a layer-2 protocol such as Ethernet.

For example, the control apparatus 1 notifies the BBU 21 of the address of an associated RRH 22 via the control interface 210. The communication section 211 changes the address of an RRH 22 to which data is to be sent, based on the address notified from the control apparatus 1. For example, the communication section 211 changes the destination MAC (Media Access Control) for transmission data to the address of the RRH 22 indicated by the control apparatus 1. Data send from the BBU 21 is forwarded on a network 23 to eventually arrive at the RRH 22, based on the destination MAC address of the RRH 22.

The BBU 21 illustrated in FIG. 13 can be also configured by using software such as virtual machine (VM: Virtual Machine). In this case, a virtual machine having the functions of a BBU 21 is configured on a computer such as a server.

FIG. 14 shows an example of the configuration of the RRH 22. The RRH 22 includes a control interface 220 and a communication section 221. The RRH 22 is controlled by the control apparatus 1 via the control interface 220.

The control apparatus 1 controls the RRH 22 based on the status of a network that is different from the radio network. For example, the control apparatus 1 can instruct the RRH 22 to change the relation of connection with a BBU 21, based on any of the parameters illustrated in the first and second exemplary embodiments.

For example, the control apparatus 1 notifies the RRH 22 of the address of an associated BBU 21 via the control interface 220. The communication section 221 changes a connection link with a BBU 21, based on the address notified from the control apparatus 1. Similarly to the BBU 21, the communication section 221 can configure a connection link with a BBU 21 based on the CPRI standards. In the example of FIG. 14, the communication section 221 establishes a connection link with a BBU 21, based on a layer-2 protocol such as Ethernet.

3.3) Control of RRH-BBU Connection

Figure 15:
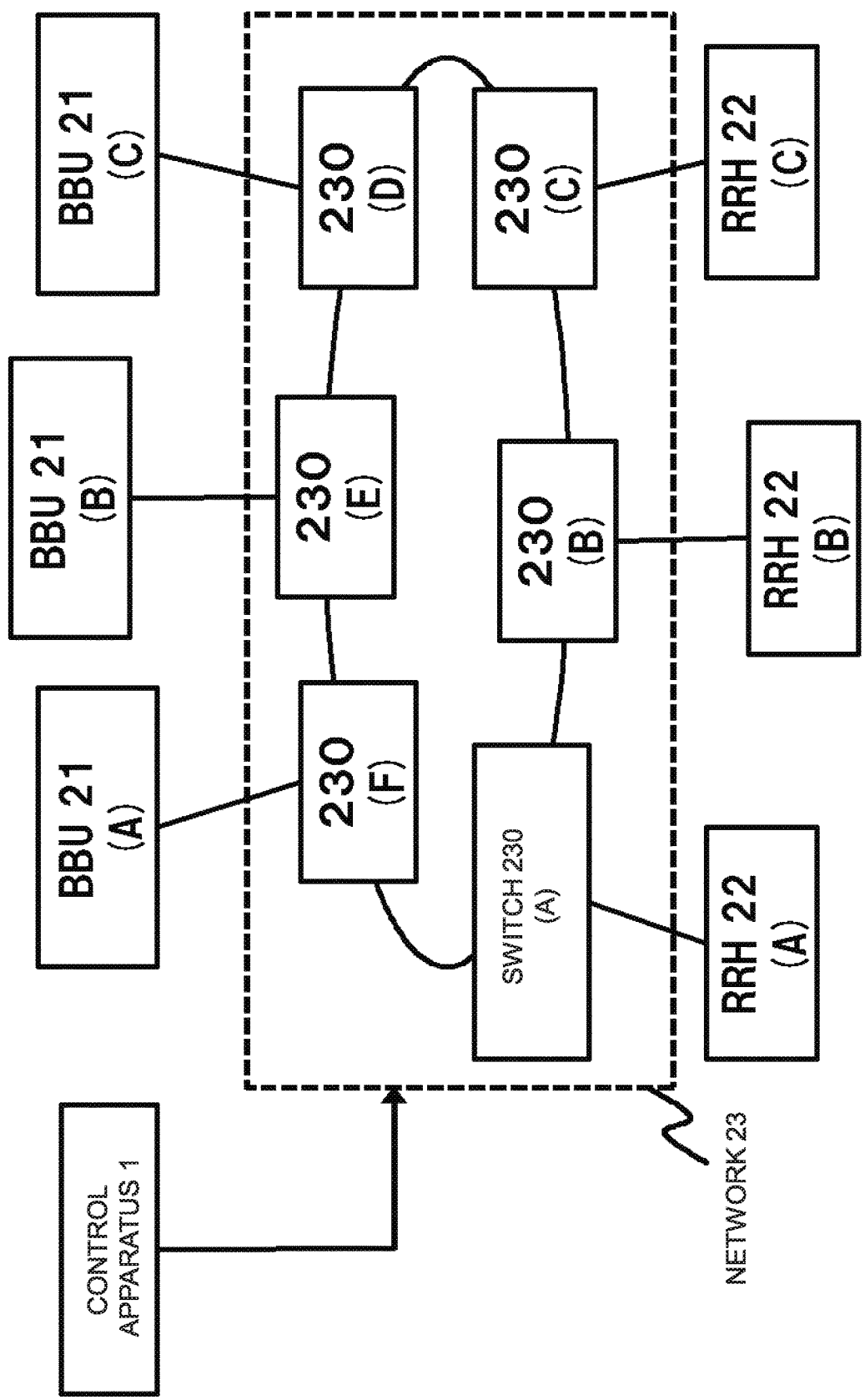
FIG. 15 is a system architecture diagram showing a second example of the communication system according to the third exemplary embodiment.
Figure 16:
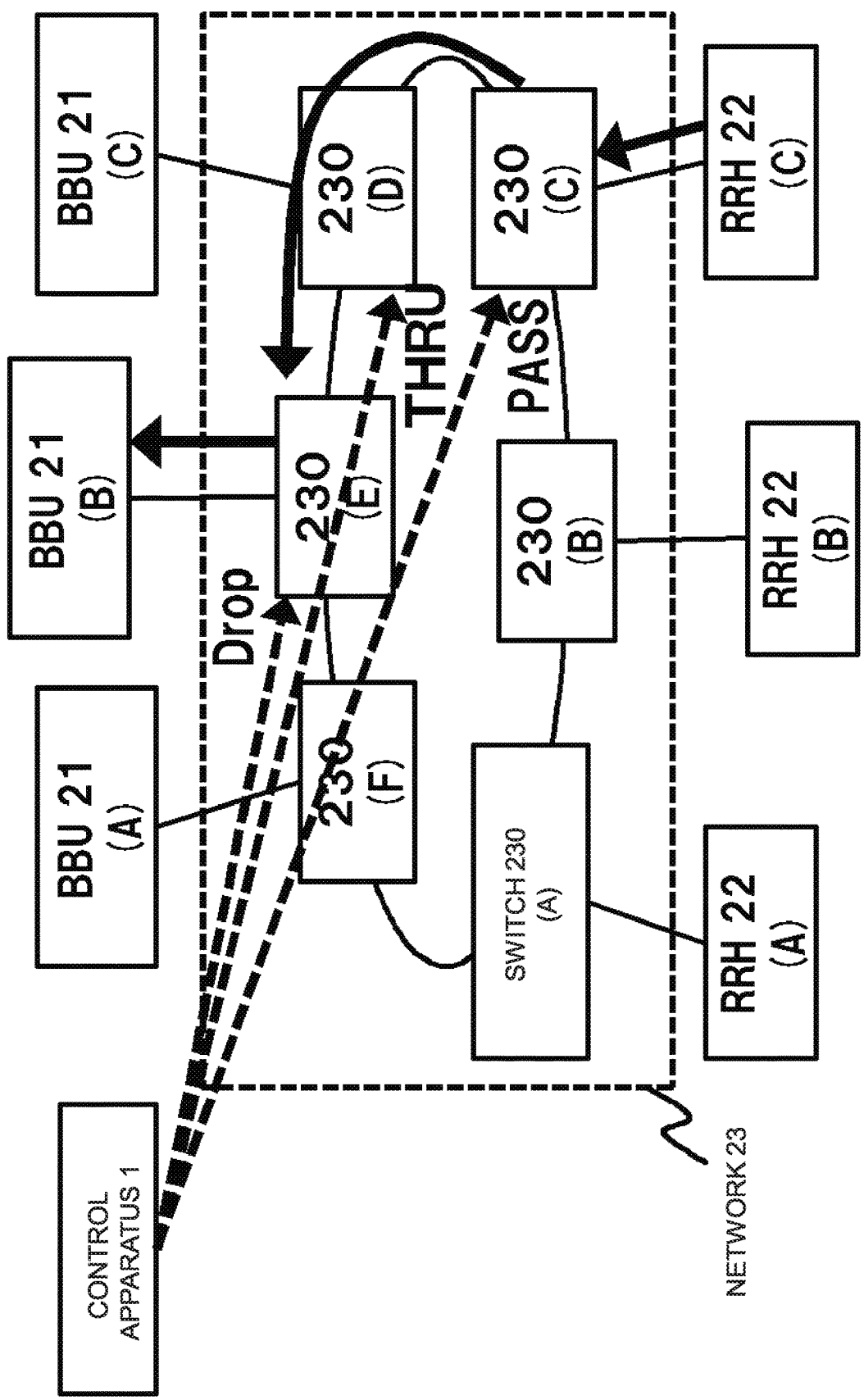
FIG. 16 is a system architecture diagram for describing operation in the communication system according to the third exemplary embodiment.
Figure 17:
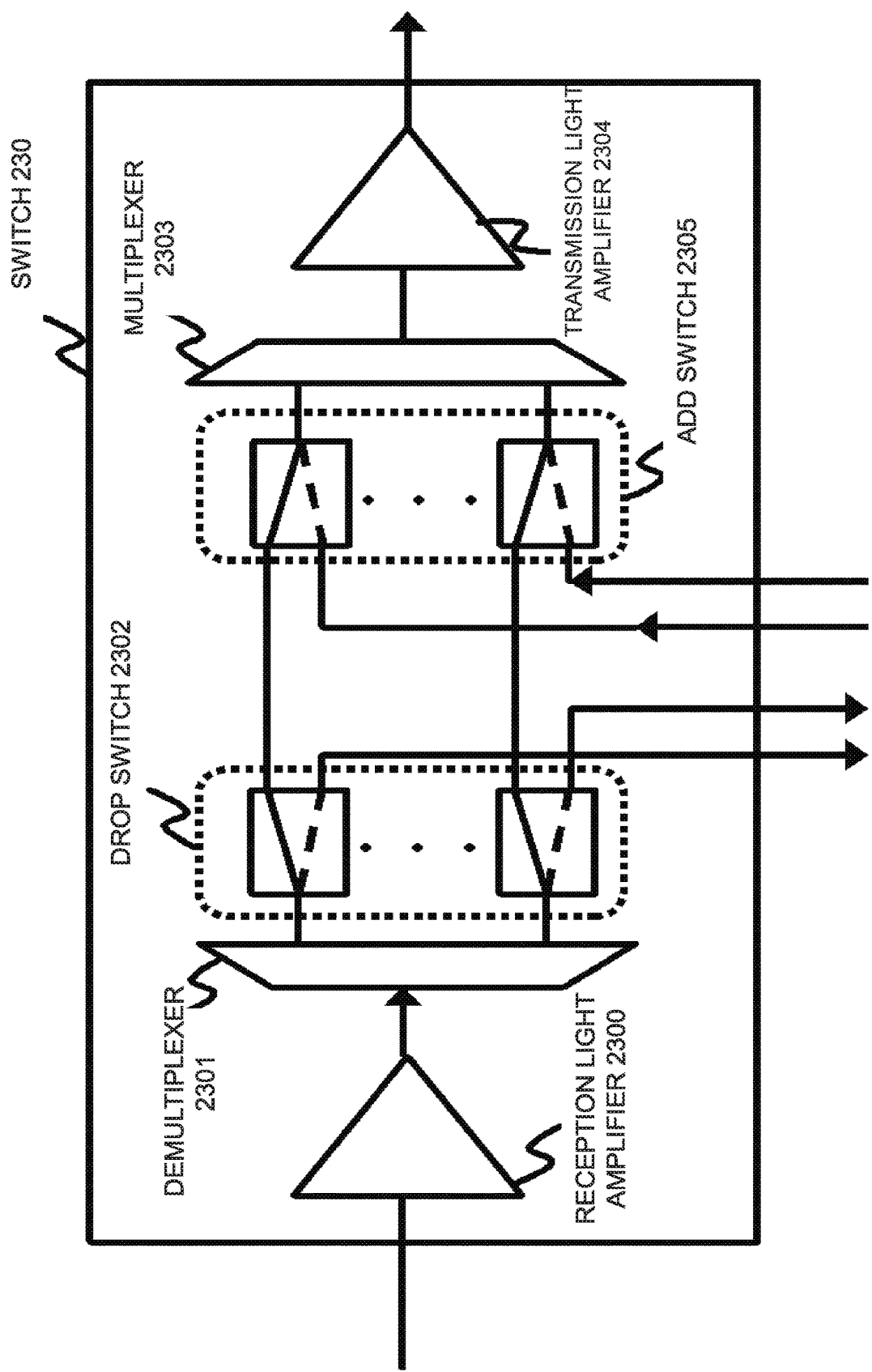
FIG. 17 is a block diagram showing an example of the configuration of a switch in the third exemplary embodiment.

FIGS. 15, 16, and 17 show an example in which the control apparatus 1 changes the relation of connection between a BBU 21 and an RRH 22 on the physical layer (layer 1) for optical transmission or the like.

In an example of the architecture of a communication system shown in FIG. 15, a network 23 includes switches 230, each establishing a connection between a BBU 21 and an RRH 22 through optical transmission. Note that the network 23 may include switches that transmit data by using electric signals, or switches that use another transmission medium. Moreover, it is also possible that the network 23 is configured such that switches of different transmission schemes coexist.

FIG. 16 shows an outline of an operation for the control apparatus 1 to change the relation of connection between a BBU 21 and an RRH 22. The network 23 as illustrated in FIG. 16 is configured with ROADM (Reconfigurable Optical Add/Drop Multiplexer) system. In ROADM system, an optical path is established by dropping/adding an optical signal. An optical path refers to a path of an optical signal exclusively having a single wavelength.

In the example of FIG. 16, it is assumed that a connection link is established between an RRH 22(C) and a BBU 21(B). The control apparatus 1 instructs a switch 230(C) to "ADD" an optical signal of a specific wavelength (here, assumed to be a wavelength "X") transmitted from the RRH 22(C). The switch 230(C) sends the added optical signal to a switch 230(D).

The control apparatus 1 instructs the switch 230(D) to "pass through (THRU)" the signal of the wavelength "X".

The control apparatus 1 instructs a switch 230(E), which is connected to the BBU 21(B), to "DROP" the signal of the wavelength "X". In accordance with the instruction from the control apparatus 1, the switch 230(E) sends the signal of the wavelength "X" sent from the RRH 22(C) to the BBU 21(B).

The switch 230 as illustrated in FIG. 17 can switch a transmission path of a received signal depending on the wavelength of the received signal. A reception light amplifier 2300 amplifies received light, and a demultiplexer 2301 demultiplexes the amplified, received light based on wavelengths.

DROP switches 2302 each switch between dropping an optical signal of demultiplexed one of the wavelength and passing the optical signal through. The individual switches 2302 correspond to the predetermined wavelengths, respectively. The control apparatus 1 can cause a switch 2302 corresponding to a wavelength to be dropped to make switching so as to drop the optical signal. Those switches 2302 that do not drop optical signals pass the corresponding optical signals through toward ADD switches.

ADD switches 2305 are switches for adding optical signals of the wavelengths corresponding to the individual switches. Normally, the ADD switches 2305 pass optical signals of the respective wavelengths through. The control apparatus 1 can cause a switch 2305 corresponding to a wavelength to be added to the ring network (network 23) to make switching so as to add the optical signal.

A multiplexer 2303 multiplexes signals of the respective wavelengths sent from the individual switches 2305, and a wavelength-multiplexed optical signal is amplified by a transmission light amplifier 2304 and sent to an adjacent switch 230.

The control apparatus 1 can establish a connection link between a BBU 21 and an RRH 22 by controlling switches 230 as illustrated in FIG. 17. In the example of FIG. 16, a connection link is established between the BBU 21(B) and the RRH 22(C).

3.4) Change of BBU-RRH Connection Link

Figure 18:
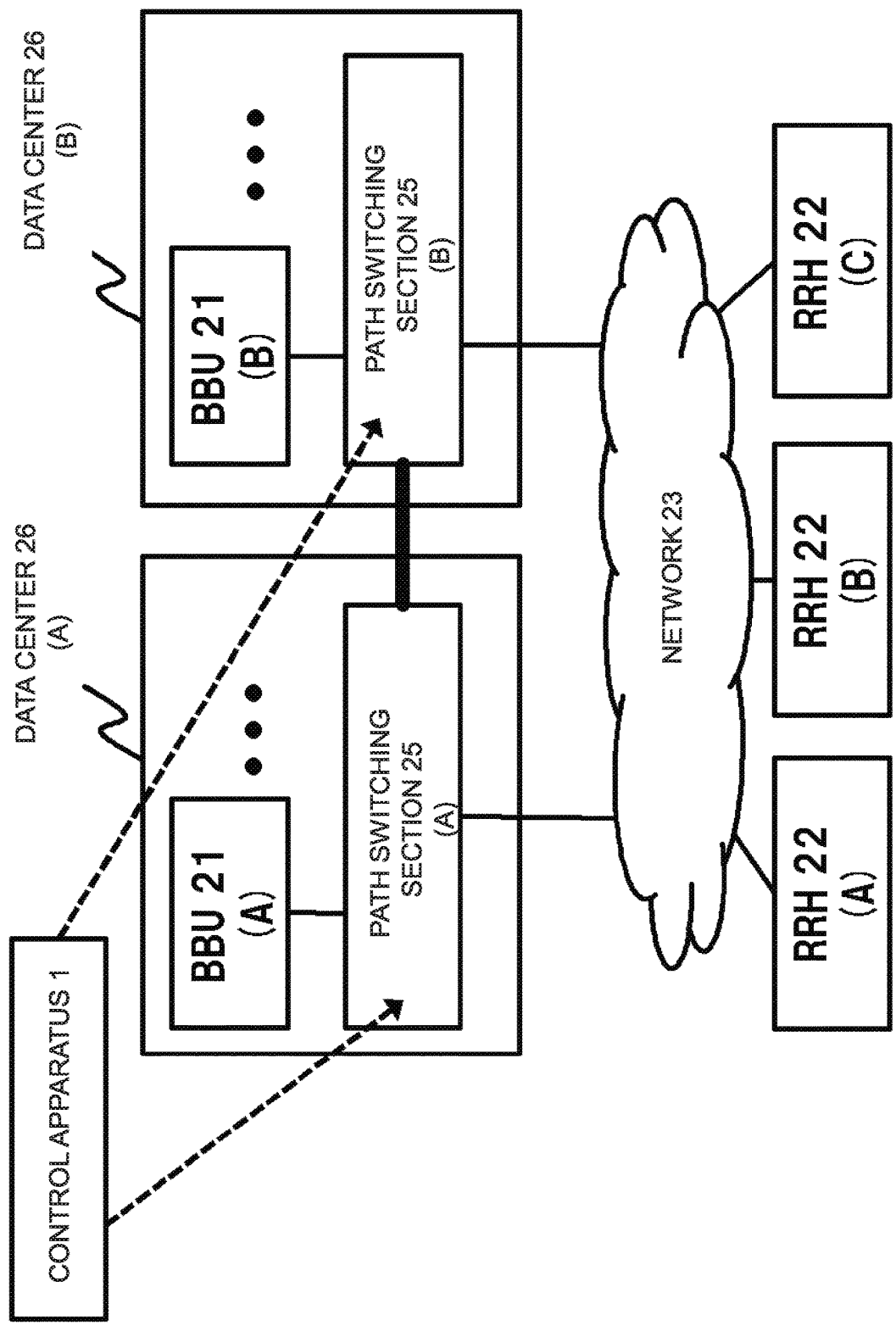
FIG. 18 is a system architecture diagram showing a third example of the communication system according to the third exemplary embodiment.
Figure 19:
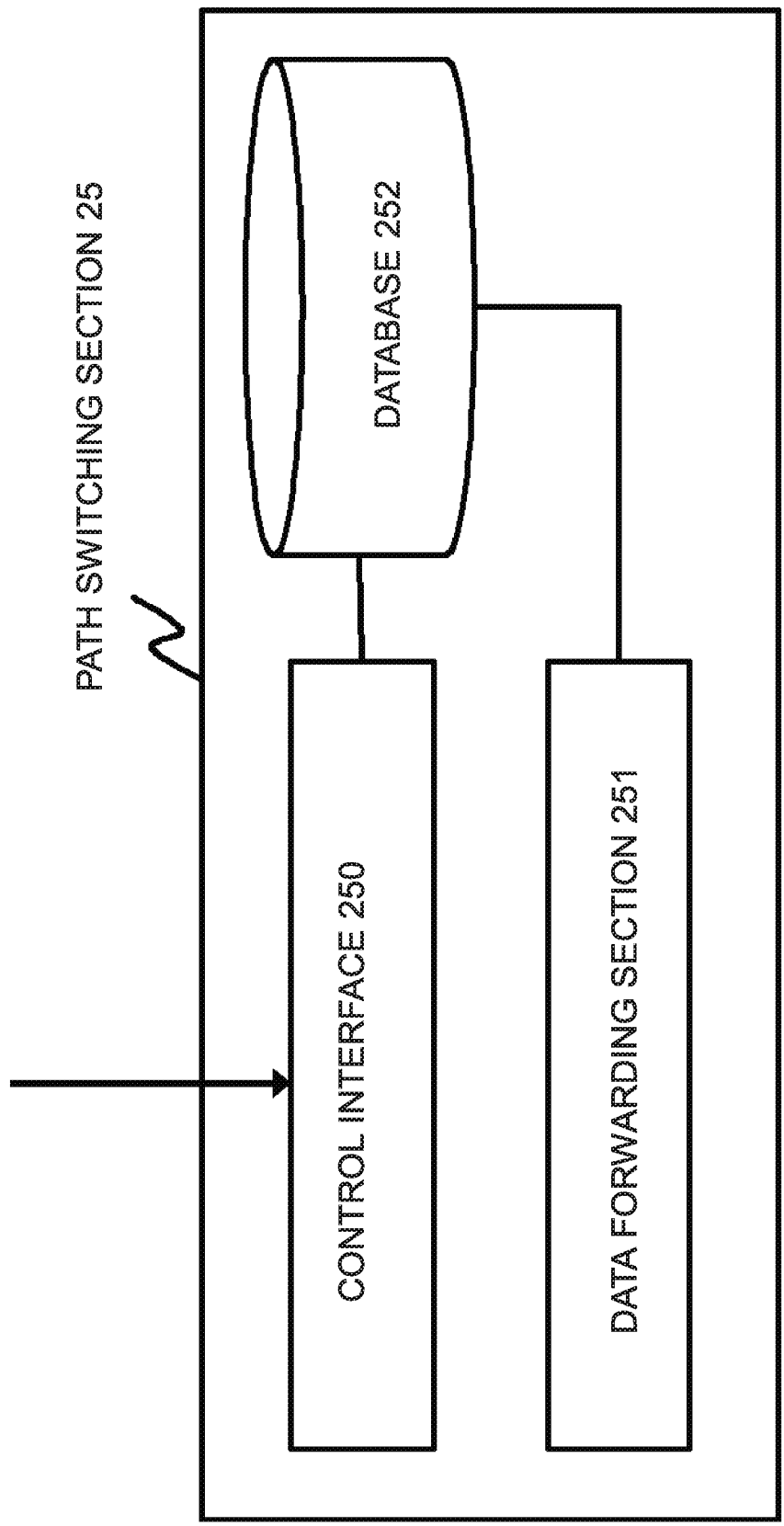
FIG. 19 is a block diagram showing an example of the configuration of a path switching section shown in FIG. 18.

FIGS. 18 and 19 show another example in which the control apparatus 1 changes a connection link between a BBU 21 and an RRH 22.

In a communication system illustrated in FIG. 18, the control apparatus 1 changes the relation of connection between a BBU 21 and an RRH 22 by controlling path switching sections 25. That is, the control apparatus 1 can change the relation of connection between a BBU 21 and an RRH 22 only by controlling the path switching sections 25. Accordingly, in the communication system illustrated in FIG. 18, the advantages of the present invention can be obtained only by introducing the path switching sections 25, without changing the architectures of the BBUs 21, RRHs 22, and network 23 from existing facilities.

In the example of FIG. 18, a plurality of BBUs 21 are accommodated in buildings such as data centers 26. For example, path switching sections 25 are connected to such a plurality of BBUs 21 and can change the relation of connection between an RRH 22 and a BBU 21. For example, the control apparatus 1 instructs the path switching section 25 to change the relation of connection between an RRH 22 and a BBU 21. For example, the path switching section 25 can switch a path from an RRH 22 to a BBU 21 on a building basis. Each building is connected to one another via a network provided between the path switching sections 25.

In the example of FIG. 18, a case is assumed where the control apparatus 1 causes an RRH 22(A) connected to a BBU 21(A) to connect to a BBU 21(B). In this case, the control apparatus 1 instructs the path switching section 25(A) to forward data sent from the RRH 22(A) to the path switching section 25(B). The control apparatus 1 may instruct the path switching section 25(A) to change, when forwarding data, the destination of the data from the address of the BBU 21(A) to the address of the BBU 21(B). Moreover, the control apparatus 1 instructs the path switching section 25(B) to forward data sent from the RRH 22(A) to the BBU 21(B). Even if the RRH 22(A) sends data to the BBU 21(A) as destination, the path switching sections 25 can forward the data to the BBU 21(B) based on the control of the control apparatus 1. Moreover, for example, it is also possible that an RRH 22 sends data to a building as destination, and a path switching section 25 routes the data sent from the RRH 22 to a BBU 21 in accordance with an instruction from the control apparatus 1. Accordingly, the control apparatus 1 can hide a change in BBU-RRH connection from the BBUs 21 and RRHs 22. In the communication system illustrated in FIG. 18, since a change in BBU-RRH connection is hid, the advantages of the present invention can be obtained without changing the architectures of the BBUs 21, RRHs 22, and network 23 from existing facilities.

In the system illustrated in FIG. 18, data centers 26(A) and 26(B) are connected to each other via the network between the path switching sections 25(A) and 25(B). However, the present invention is not limited to such a system architecture. For example, it is also possible that the control apparatus 1 instructs the path switching section 25(A) to change the destination of data sent from the RRH 22(A) to the BBU 21(A) as destination to the BBU (B) and forwards this data to the network 23. The forwarded data, on the network 23, is forwarded toward the changed destination (i.e., the BBU 21(B)).

FIG. 19 shows an example of the configuration of the path switching section 25. The path switching section 25 includes a control interface 250, a data forwarding section 251, and a database 252. The path switching section 25 is controlled by the control apparatus 1 via the control interface 250. The control interface 250 stores an instruction from the control apparatus 1 into the database 252.

The instruction stored in the database 252 includes, for example, an identification condition for identifying data and a processing rule for the data that matches the identification condition. The identification condition is, for example, a condition based on data-related information, such as a destination address, a source address, a wavelength, and the like. For example, an identification condition in the example of FIG. 18 is "the source address is RRH (A) and the destination address is BBU (A)," or the like. Examples of the processing rule include a rule indicating the forwarding destination of data that matches the identification condition, a rule for rewriting the content of data (e.g., the destination of data) that matches the identification condition, and the like. For example, a processing rule in the example of FIG. 18 is "forward data to the path switching section (B)," "change the destination of data to the address of BBU (B) and forward to the path switching section (B)," or the like.

It is also possible that an RRH 22 sends data to an address (a virtual address) common to a plurality of BBUs 21 accommodated in a data center 26. In this case, the path switching section 25 forwards data sent to the virtual address as destination to a BBU 21 indicated by the control apparatus 1. The control apparatus 1 instructs the path switching section 25 to change a BBU 21 to which data is to be forwarded, based on the address of a source RRH. The control apparatus 1 instructs the path switching section 25 to forward data from a BBU 21 to an RRH 22 as destination, to an RRH 22 associated with the source BBU 21. It is also possible that the control apparatus 1 instructs the path switching section 25 to forward data addressed to the virtual address corresponding the data center 26, to another data center 26.

For example, the data forwarding section 251 searches the database 252 for an instruction having an identification condition that matches received data. When the instruction having the identification condition that matches the received data is retrieved, the data forwarding section 252 processes the data in accordance with a processing rule in this instruction.

4. Fourth Exemplary Embodiment

According to a fourth exemplary embodiment of the present invention, a control apparatus 1 changes the relation of connection between a BBU 21 and an RRH 22, based on a predetermined parameter (e.g., the types of network operators) for logically dividing a radio network. Even if the radio network is shared among a plurality of users, the control apparatus 1 can virtually divide radio resources to be used by the users. The radio resources are virtually divided, whereby, for example, the control apparatus 1 can enhance security in the radio network. Note that the fourth exemplary embodiment is applicable to any of the above-described first to third exemplary embodiments.

Figure 20:
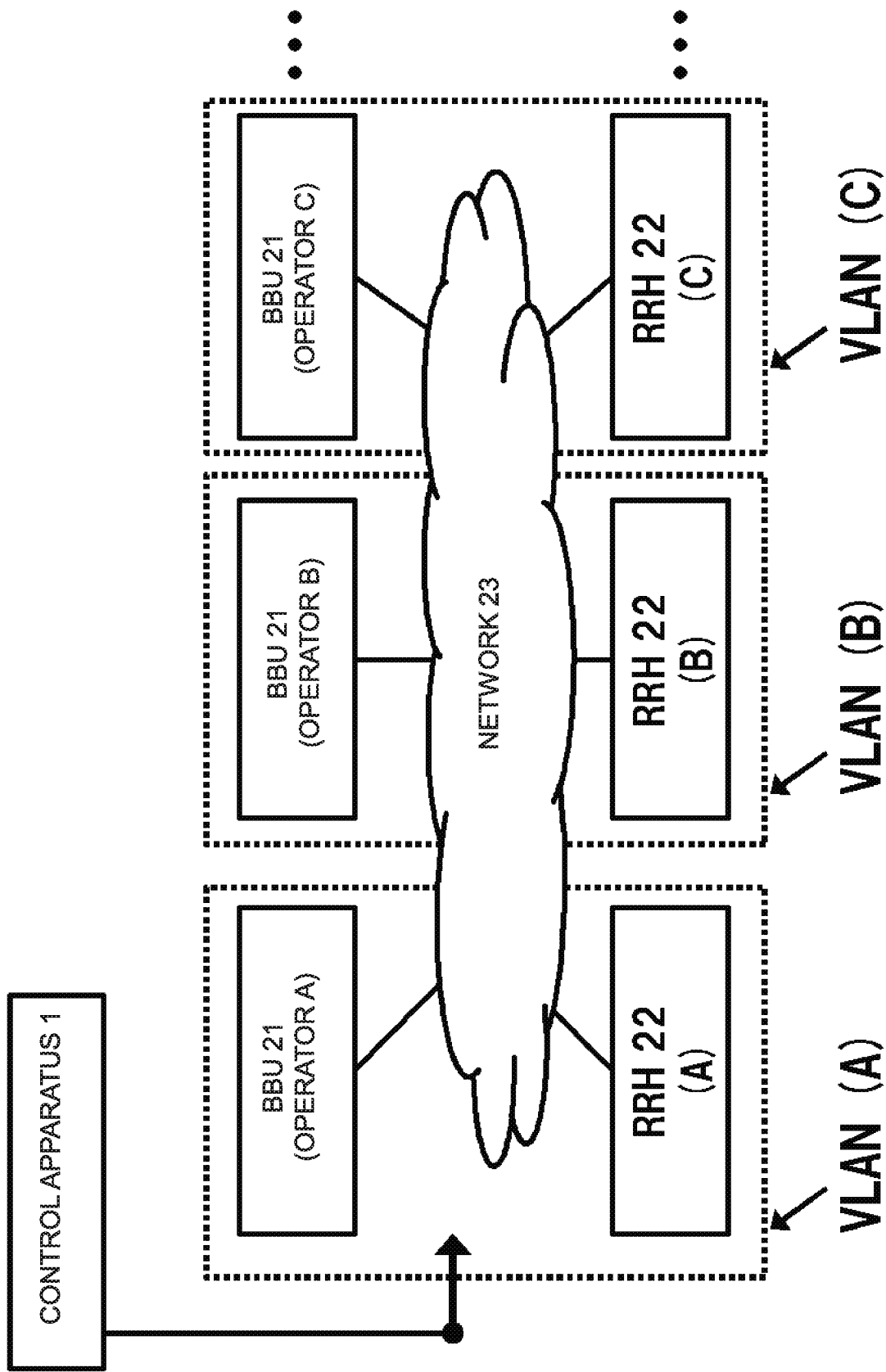
FIG. 20 is a system architecture diagram showing an example of a system according to a fourth exemplary embodiment of the present invention.

As illustrated in FIG. 20, the control apparatus 1 can determine the relation of connection between a BBU 21 and an RRH 22, based on the types of operators. For example, the control apparatus 1 configures a VLAN (Virtual Local Area Network) for each operator type, thereby virtually dividing the radio network. Note that FIG. 20 is for illustration, and the fourth exemplary embodiment is not limited to the architecture shown in FIG. 20. For example, it is also possible that the control apparatus 1 determines the relation of connection between a BBU 21 and an RRH 22, according to the user classes of terminals 24, communication QoS (Quality of Service), or the like.

The control section 11 of the control apparatus 1 controls the relation of connection between an RRH 22 and a BBU 21 based on a parameter for virtually dividing the radio network so that a BBU 21 to be associated with an RRH 22 will be assigned according to the parameter. That is, the control section 11 can limit the relation of connection between a BBU 21 and an RRH 22 so that, within a virtual network according to the parameter, an RRH 22 will be connected to a BBU 21 that belongs to this virtual network. Accordingly, for example, the control section 11 can control the relation of connection between a BBU 21 and an RRH 22 so that the radio network shared among a plurality of users will be logically divided according to the parameter.

For example, the control section 11 configures a VLAN for each operator type and thereby can control the relation of connection between an RRH 22 and a BBU 21 based on the VLANs. The control section 11 can notify VLAN configuration to the RRHs 22 and BBUs 21.

For example, the control section 11 configures VLANs based on user classes acquired from HSSs (Home Subscriber Servers) and thereby can control the relation of connection between an RRH 22 and a BBU 21 according to the VLANs. For example, the user classes are classified into premium user, normal user, and the like according to charging. For example, the control section 11 allocates radio resources (a BBU 21 and an RRH 22) that fulfill communication quality to be provided to premium users, to a VLAN corresponding to premium user.

For example, the control section 11 may configure VLANs based on the QCIs (QoS Class Identifiers) of bearers acquired from an MME 40 or a gateway apparatus and may control the relation of connection between an RRH 22 and a BBU 21 according to the VLANs. For example, the control section 11 changes the allocation of radio resources (a BBU 21 and an RRH 22) depending on a QCI. For example, the control section 11 increases radio resources to allocate to a VLAN corresponding to a predetermined value or higher of QCI, as compared to VLANs corresponding to other QCIs.

In the above-described first to third exemplary embodiments, the interface 10 of the control apparatus 1 is used to acquire information from the backbone network. In the fourth exemplary embodiment, a parameter for dividing the radio network may be acquired from the backbone network, as in the first to third exemplary embodiments. Moreover, for example, the interface 10 may be used to acquire a parameter for dividing the radio network (e.g., information related to VALN configuration for each operator type) from an operation administrator of the radio network. That is, it is also possible that the fourth exemplary embodiment is implemented independently of the above-described first to third exemplary embodiments.

Figure 21:
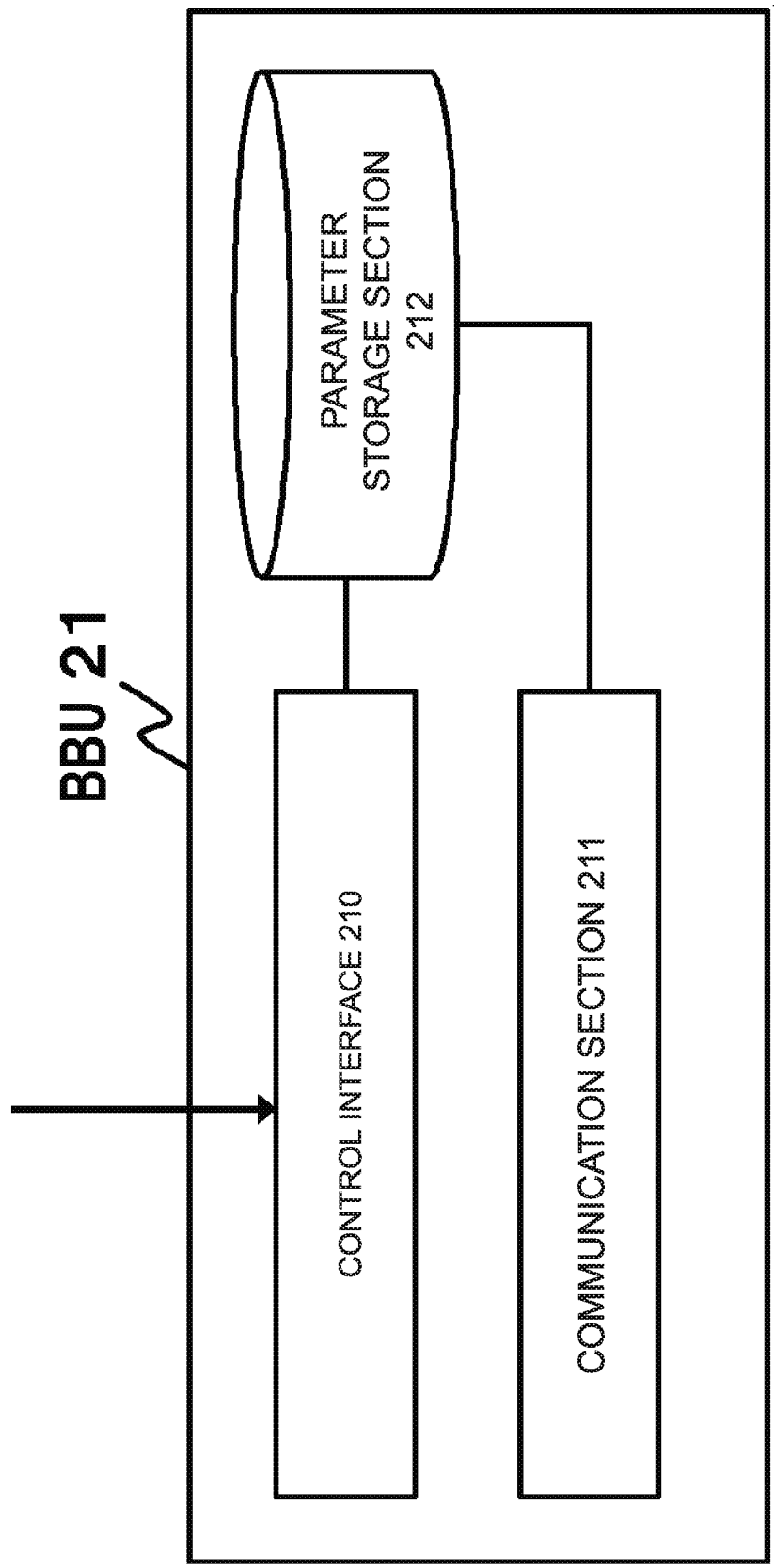
FIG. 21 is a block diagram showing an example of the configuration of a BBU shown in FIG. 20.
Figure 22:
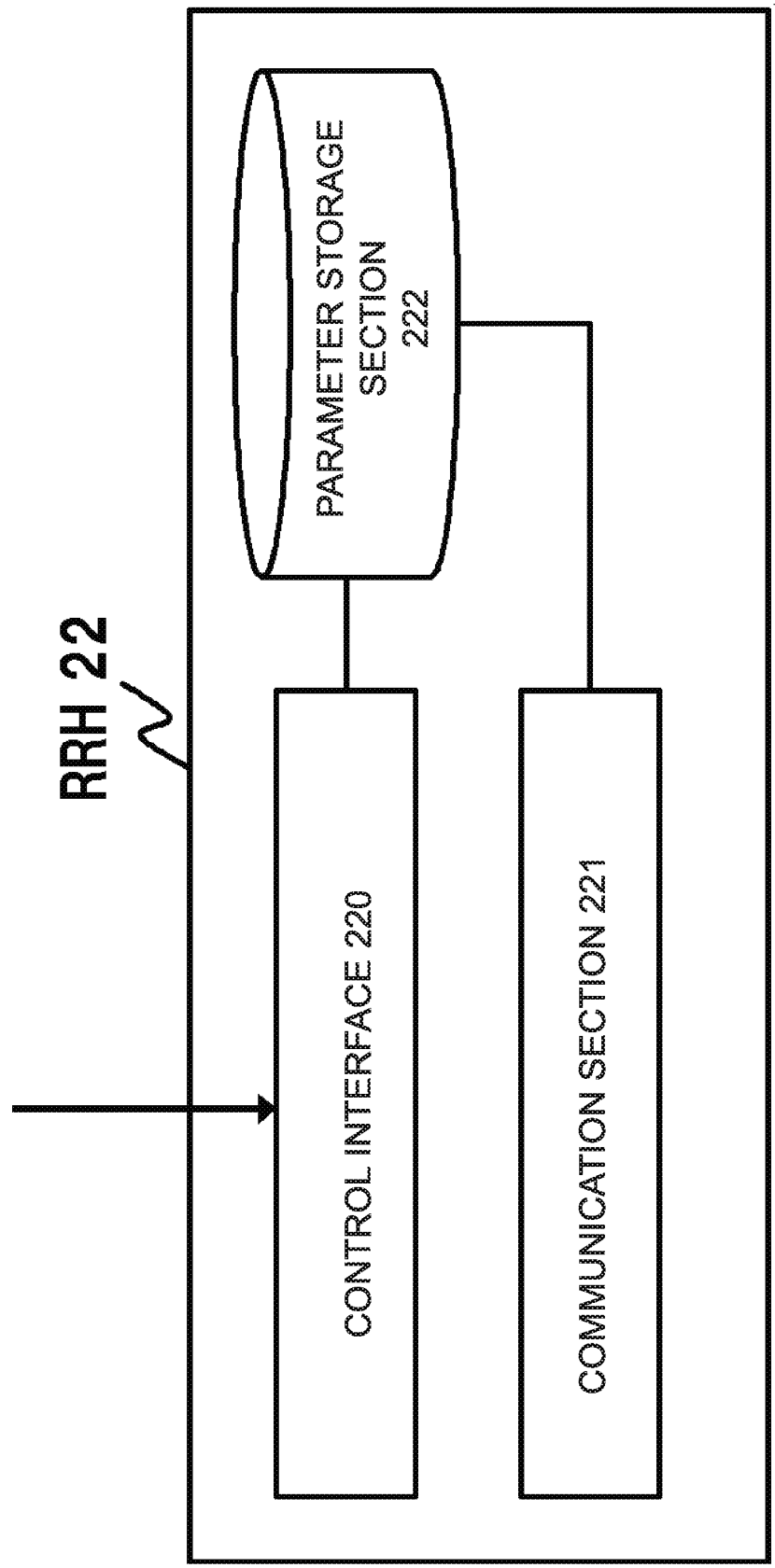
FIG. 22 is a block diagram showing an example of the configuration of an RRH shown in FIG. 20.

FIGS. 21 and 22 show examples of the configurations of a BBU 21 and an RRH 22, respectively.

The BBU 21 illustrated in FIG. 21 includes a parameter storage section 212. Except for this point, the other configuration thereof is similar to the configuration illustrated in the above-described third exemplary embodiment.

The control apparatus 1 notifies a parameter for dividing the radio network to the BBU 21 via the control interface 210. For example, the control apparatus 1 notifies information about an operator associated with the BBU 21 and a VLAN associated with this operator to the BBU 21 via the control interface 210. The information notified from the control section 11 is stored in the parameter storage section 212.

The communication section 211 controls a region of transmission/reception of data so that the BBU 21 to be associated with an RRH 22 will be assigned based on the parameter. For example, the communication section 211 refers to the parameter storage section 212, adds a VLAN identifier (e.g., a VLAN tag defined by IEEE 802.1Q) to data to be sent to the RRH 22, and sends this data. Moreover, the communication section 211 limits data to be received to those within the range of a VLAN. Accordingly, the communication section 211 can limit the region of transmission/reception of data so that, within a virtual network according to the parameter, an RRH 22 will be connected to the BBU 21 that belongs to this virtual network.

The RRH 22 illustrated in FIG. 22 includes a parameter storage section 222. Except for this point, the other configuration thereof is similar to the configuration illustrated in the above-described third exemplary embodiment.

The control apparatus 1 notifies a parameter for dividing the radio network to the RRH 22 via the control interface 220. For example, the control section 11 of the control apparatus 1 notifies information about an operator associated with the RRH 22 and a VLAN associated with this operator to the RRH 22 via the control interface 220. The information notified from the control section 11 is stored in the parameter storage section 222.

For example, the communication section 221 refers to the parameter storage section 222, adds a VLAN identifier to data to be sent to a BBU 21, and sends this data.

The communication section 221 controls a region of transmission/reception of data so that a BBU 21 to be associated with the RRH 22 will be assigned based on the parameter. For example, the communication section 221 refers to the parameter storage section 222, adds a VLAN identifier to data to be sent to the BBU 21, and sends this data. Moreover, the communication section 221 limits data to be received to those within the range of a VLAN. Accordingly, the communication section 221 can limit the region of transmission/reception of data so that, within a virtual network according to the parameter, the RRH 22 will be connected to a BBU 21 that belongs to this virtual network.

For example, the control section 11 of the control apparatus 1 may notify the RRH 22 of a list indicating correspondences between frequencies corresponding to operator types and VLANs of these frequencies. In this case, the communication section 221 of the RRH 22 can refer to the list and change a VLAN identifier to add to data to be sent to a BBU 21, depending on a radio frequency to be used for communication with a terminal 24.

Figure 23:
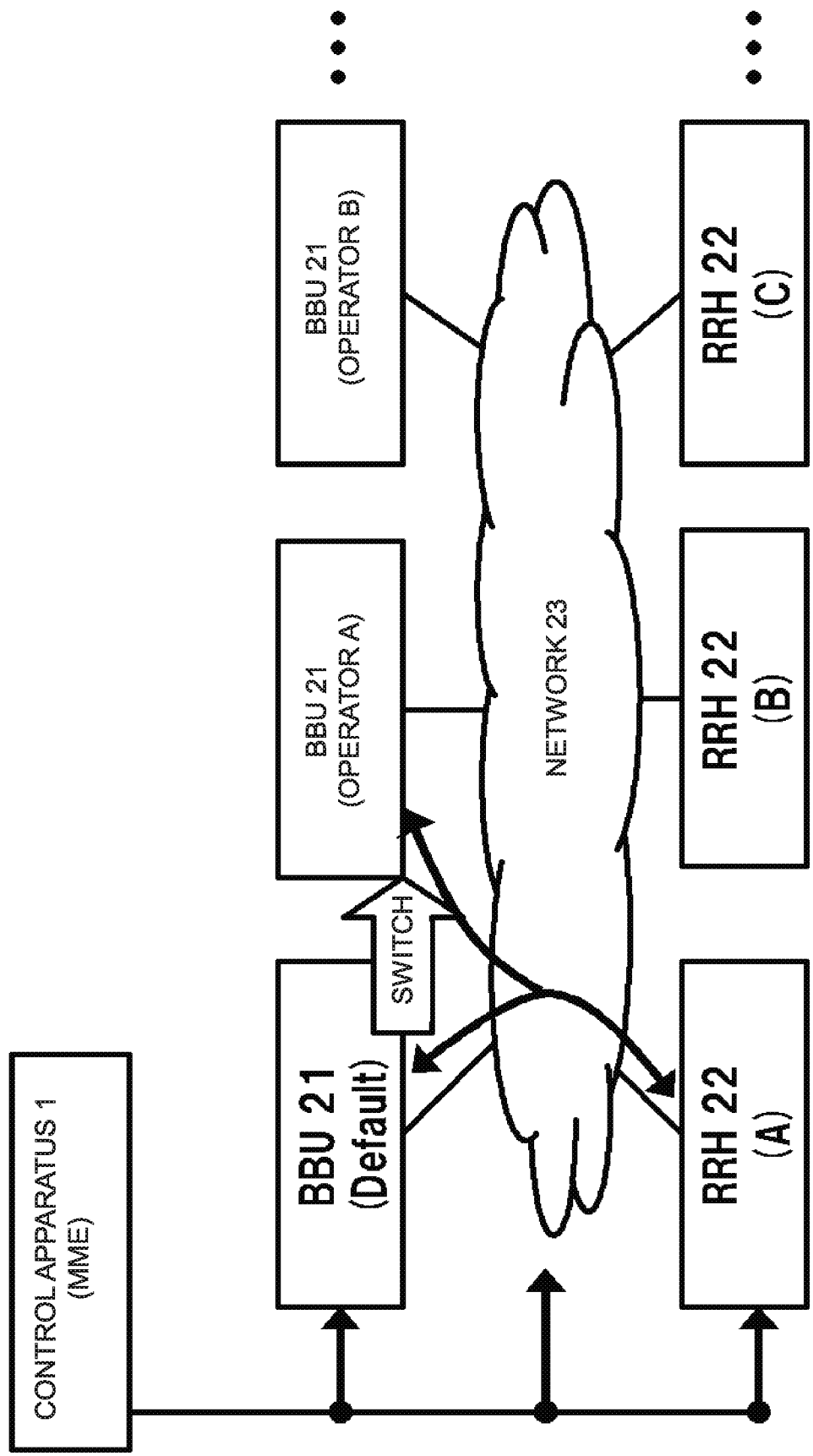
FIG. 23 is a system architecture diagram for describing an example of operation in the communication system according to the fourth exemplary embodiment.

As illustrated in FIG. 23, the control apparatus 1 can change the relation of connection between a BBU 21 and an RRH 22 based on an operator chosen by a terminal 24. FIG. 23 shows an example in which an MME 40 of LTE system has the functions of the control apparatus 1. However, the present invention is not limited to this example. For example, the MME 40 and the control apparatus 1 may be different apparatuses. Note that in FIG. 23, a BBU common to a plurality of operators is denoted as "BBU 21 (Default)".

In the example of FIG. 23, the control apparatus 1 changes the relation of connection between a BBU 21 and an RRH 22 depending on an operator chosen by a terminal 24 in a procedure for establishing a connection between the terminal 24 and a network. For example, the connection is changed as depicted in the figure from a connection between an RRH 22(A) and the BBU 21 (Default) to a connection between the RRH 22(A) and a BBU 21 of a chosen operator A.

Figure 24:
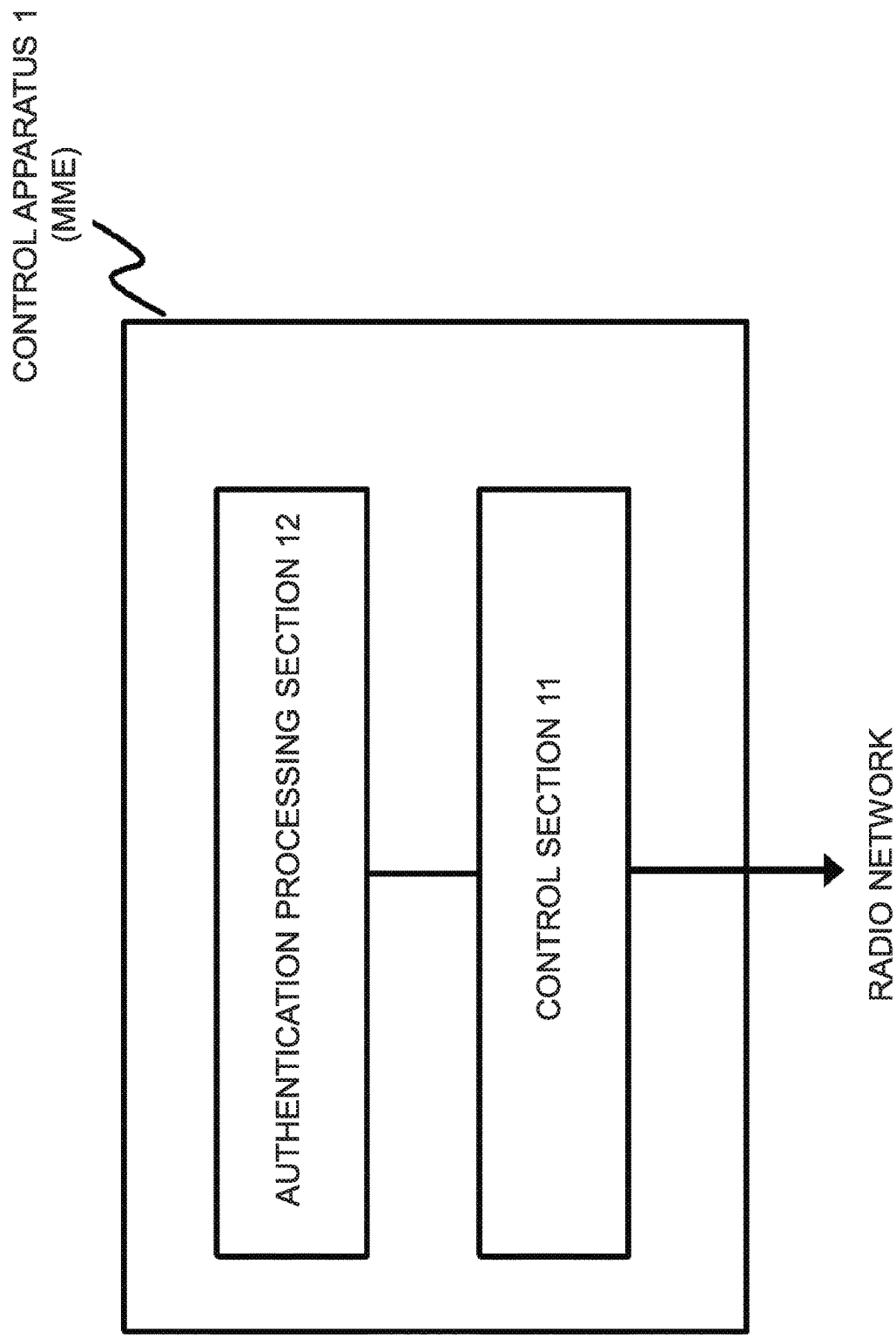
FIG. 24 is a block diagram showing an example of the configuration of a control apparatus according to the fourth exemplary embodiment.

A control apparatus 1 as illustrated in FIG. 24 includes a control section 11 and an authentication processing section 12. Here, since the MME 40 has the functions of the control apparatus 1, such an MME 40 will be denoted as "control apparatus 1 (MME)" hereinafter. The details of the elements of the control apparatus 1 shown in FIG. 24 will be described in an example of operation in the system shown in FIG. 25.

Figure 25:
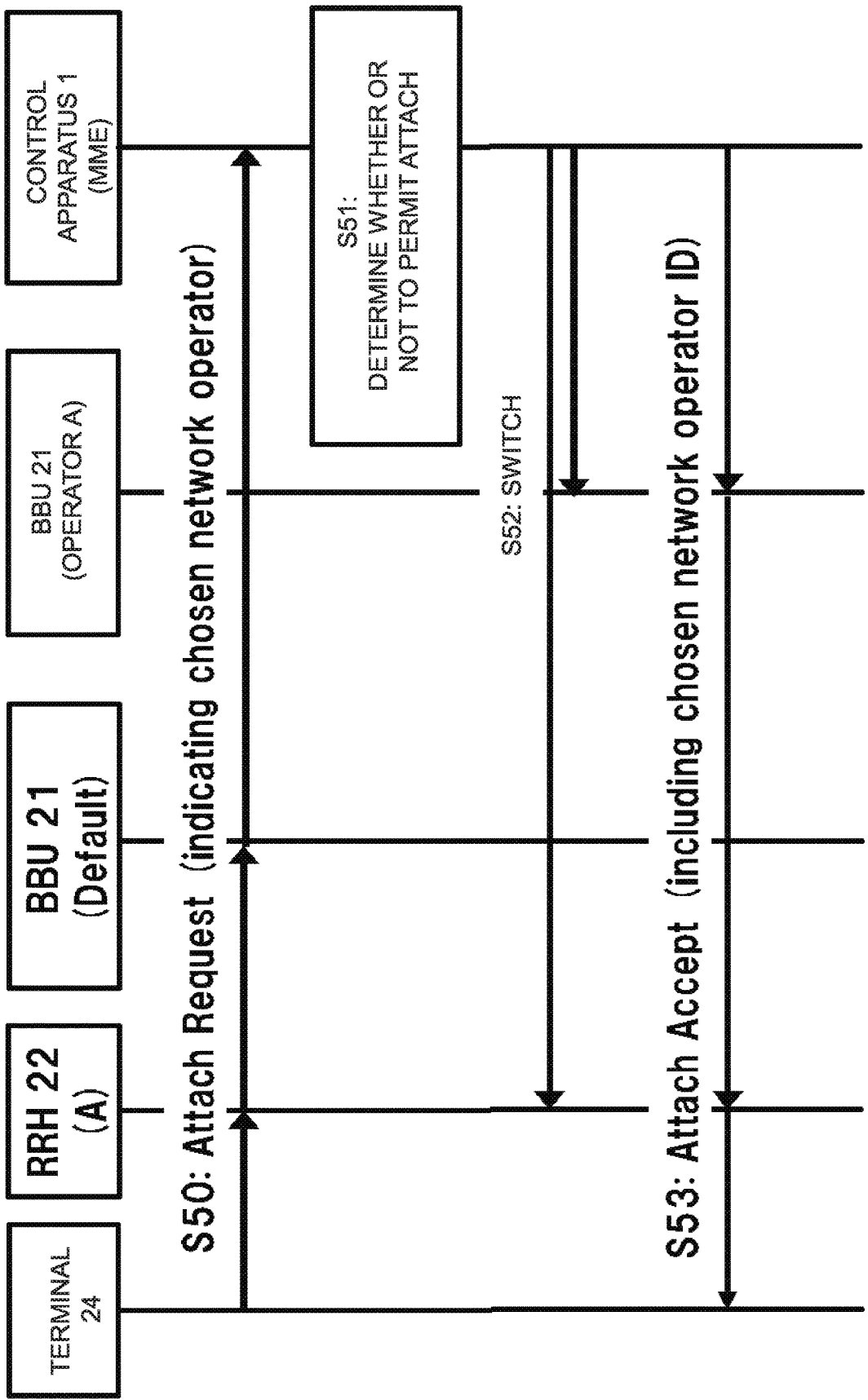
FIG. 25 is a sequence chart showing an example of operation in the communication system according to the fourth exemplary embodiment.

Referring to FIG. 25, the terminal 24 sends a request for attaching to a network to the control apparatus 1 (MME) via an RRH 22 and a BBU 21 (Operation S50). Note that in the example of FIG. 23, the terminal 24, when sending the attach request, accesses the network via the BBU 21 (Default). The attach request sent to the control apparatus 1 (MME) includes information indicating an operator chosen by the terminal 24. Assuming that the terminal 24 has chosen the operator A, the interface 10 of the control apparatus 1 (MME) acquires information indicating the operator A chosen by the terminal 24. When having acquired the chosen-operator information, the authentication processing section 12 of the control apparatus 1 (MME) determines whether or not the terminal 24 may attach to the network of the chosen operator A (Operation S51).

When the authentication processing section 12 permits the terminal 24 to attach, the control section 11 of the control apparatus 1 (MME) switches a BBU for the terminal 24 to connect to via an RRH 22, to a BBU 21 corresponding to the operator A chosen by the terminal 24 ("BBU 21 (Operator A)" in FIGS. 23 and 25) (Operation S52). For example, the control section 11 changes the relation of connection between an RRH and a BBU by any method illustrated in the above described first to third exemplary embodiments. For example, the control section 11 notifies the address of the BBU 21 (Operator A) as the address of a connection-target BBU to the RRH 22(A). Similarly, the control section 11 notifies the address of the RRH 22(A) to the BBU 21 (Operator A).

If the attach request is accepted, the control section 11 sends an "Attach Accept" message to the terminal 24 (Operation S53). The "Attach Accept" message may include the identifier of the chosen operator.

5. Fifth Exemplary Embodiment

A control apparatus 1 according to a fifth exemplary embodiment of the present invention can control BBU 21 resources, based on the status of a backhaul network 3, a core network 4, or the like. For example, the control apparatus 1 can install or uninstall a BBU 21, based on the statue of a backhaul network 3 or a core network 4. In the fifth exemplary embodiment, since the functions of a BBU 21 are implemented by using software operating on a virtual machine, the control apparatus 1 can perform BBU 21 resource control. That is, the control apparatus 1 can perform BBU 21 resource control by installing or uninstalling software (e.g., a virtual machine) having the functions of a BBU 21.

However, even if a BBU 21 is simply installed, there is a possibility that effects expected from the BBU installation cannot be obtained depending on the status of a backhaul network 3, a core network 4, or the like. Accordingly, the control apparatus 1 according to the fifth exemplary embodiment installs a BBU 21 based on the status of a backhaul network 3, a core network 4, or the like. Since BBU installation is performed depending on the status of a network, the possibility is increased that effects expected from the BBU installation can be obtained. Moreover, the control apparatus 1 can also uninstall a BBU 21 based on the status of a backhaul network 3, a core network 4, or the like, and can achieve more effective resource use because unrequired resources are suppressed. Note that the fifth exemplary embodiment as described above is applicable to any of the above-described first to fourth exemplary embodiments.

Figure 26:
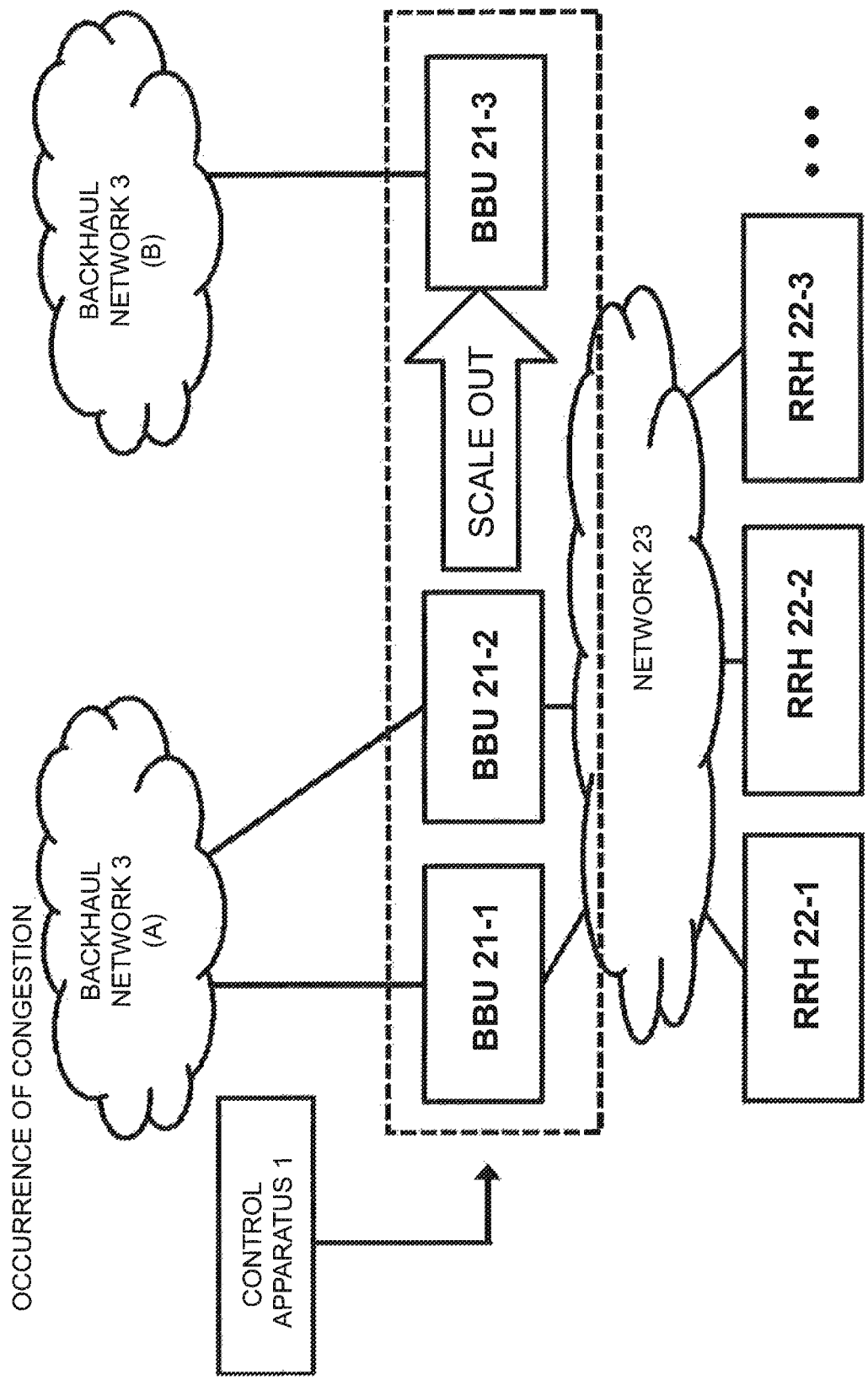
FIG. 26 is a system architecture diagram showing an example of the architecture of a communication system according to a fifth exemplary embodiment of the present invention.

FIG. 26 shows an outline of the fifth exemplary embodiment. The control apparatus 1 installs a BBU 21 based on the status of a backhaul network 3 or a core network 4 (not shown in FIG. 26). Note that the control apparatus 1 can also uninstall a BBU 21 based on the status of a backhaul network 3 or a core network 4, which is not shown in FIG. 26.

Figure 27:
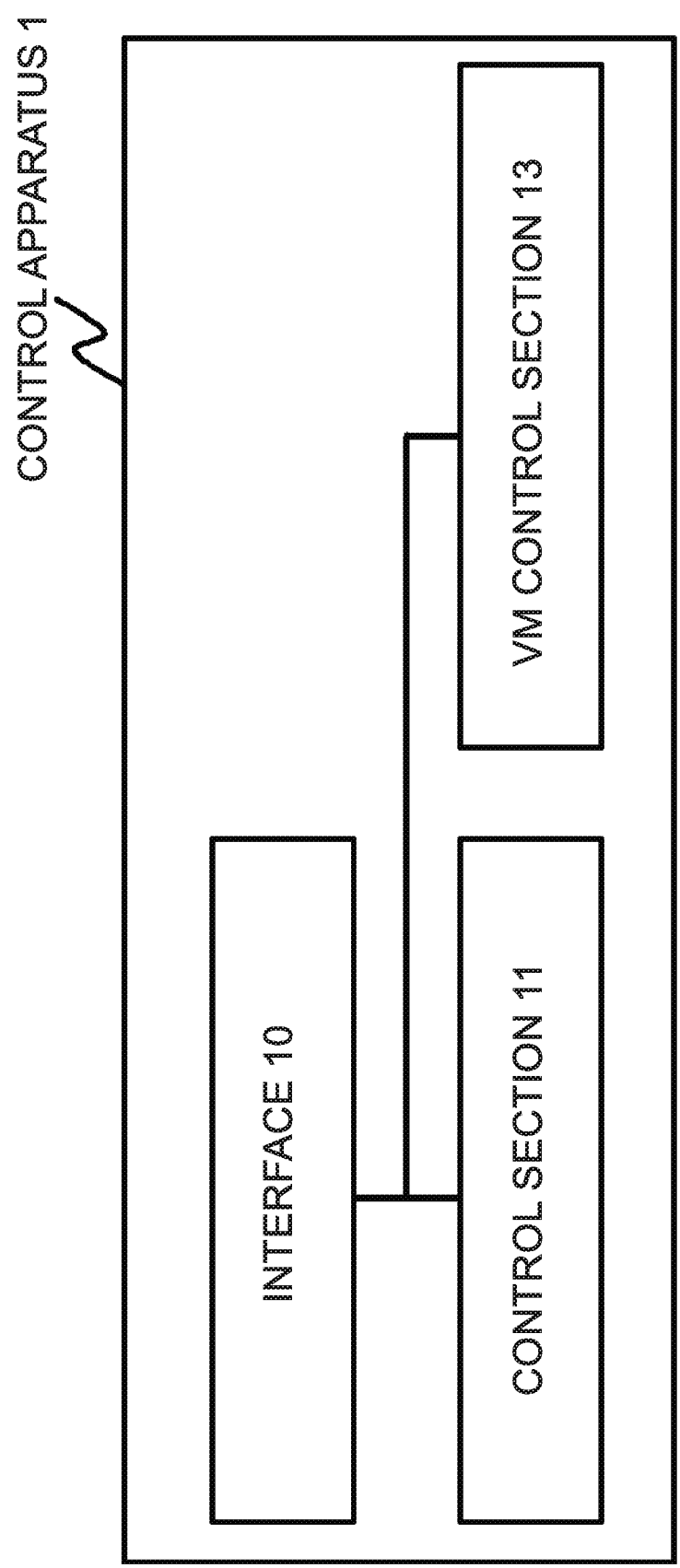
FIG. 27 is a block diagram showing an example of the configuration of a control apparatus according to the fifth exemplary embodiment.

FIG. 27 shows an example of the configuration of the control apparatus 1 according to the fifth exemplary embodiment. The control apparatus 1 has a VM control section 13. Except for this point, the other components are similar to those illustrated in the above-described exemplary embodiments, and therefore a detailed description thereof will be omitted.

The VM control section 13 installs or uninstalls software having the functions of a BBU 21, based on the status of a backhaul network 3 or a core network 4. For example, the VM control section 13 activates the software having the functions of a BBU 21 on a server installed in a building such as a data center.

The VM control section 13 can control BBU 21 resources so that the relation of connection between at least one of the BBUs 21 and a backhaul network 3 or a core network 4 can be changed. For example, the VM control section 13 installs a BBU 21 that can connect to a backhaul 3 under a load equal to or lower than a threshold. The control section 11 switches an RRH 22 associated with a BBU 21 under a load equal to or higher than a threshold to the installed BBU 21. Moreover, for example, the VM control section 13 installs a BBU 21 that can connect to a backhaul 3 having an available communication resource equal to or greater than a threshold. The control section 11 switches an RRH 22 associated with a BBU 21 under a load equal to or higher than a threshold to the installed BBU 21. With the above-described functions, the VM control section 13 can control BBU 21 resources so that degradation will be suppressed in the communication performance between the radio network including the BBUs 21 and a backhaul network 3 or a core network 4.

Figure 28:
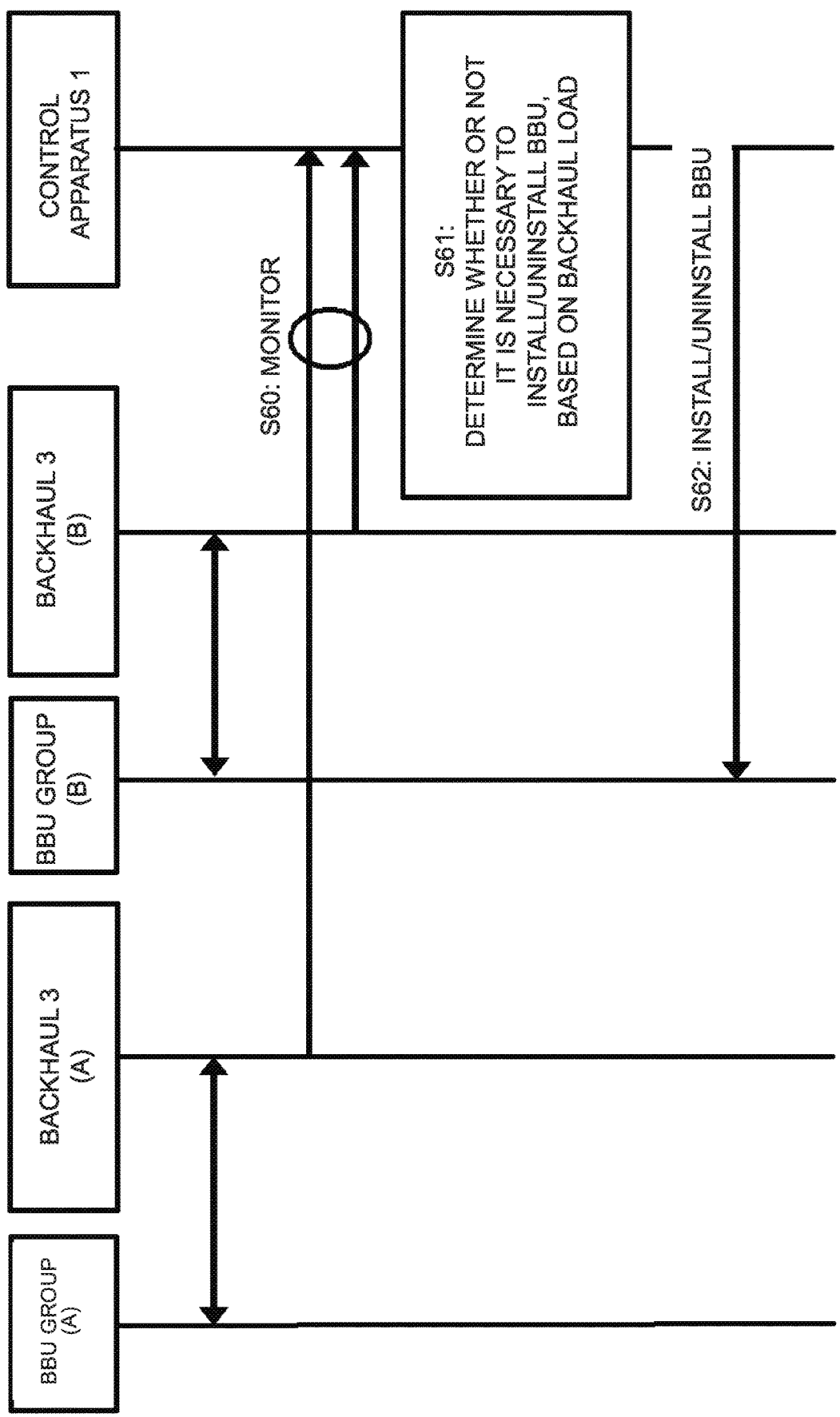
FIG. 28 is a sequence chart showing a first example of operation in the communication system according to the fifth exemplary embodiment.

FIG. 28 is a sequence chart showing an example of operation in the fifth exemplary embodiment. In the example of FIG. 28, the control apparatus 1 installs a BBU 21 based on the status of a backhaul network 3.

In the example of FIG. 28, a plurality of BBUs 21 (a BBU group (A) in the figure) are connected to a backhaul network 3(A). Moreover, a BBU group (B) is connected to a backhaul network 3(B).

The control apparatus 1 monitors each backhaul network 3 via the interface 10 (Operation S60). For example, the control apparatus 1 monitors the load on (congestion status or the like of) each backhaul network 3.

For example, the VM control section 13 of the control apparatus 1 determines whether or not it is necessary to install, or to uninstall, software (a virtual machine) having the functions of a BBU 21, based on the loads on the backhaul networks 3 (Operation S61).

The VM control section 13 installs or uninstalls a BBU 21, depending on the load on a backhaul.

For example, the VM control section 13 installs a BBU 21 when a backhaul network 3 exists that is under a load equal to or higher than a predetermined threshold. For example, the VM control section 13 installs a BBU 21 so that the installed BBU 21 will be connected to a backhaul network 3 under a load equal to or lower than a predetermined threshold. Even if a BBU 21 is installed, effects obtained by the installation may be less than an expected value if the installed BBU 21 is connected to a backhaul under a high load. A BBU 21 is installed so as to be connected to a backhaul under a load equal to or lower than the predetermined threshold, whereby the possibility is increased that expected effects can be obtained.

The control section 11 of the control apparatus 1 connects the installed BBU 21 and an RRH 22. For example, the control section 11 connects an RRH 22 associated with a BBU 21 that is connected to the backhaul under a load equal to or higher than the predetermined threshold to the installed BBU 21.

Figure 29:
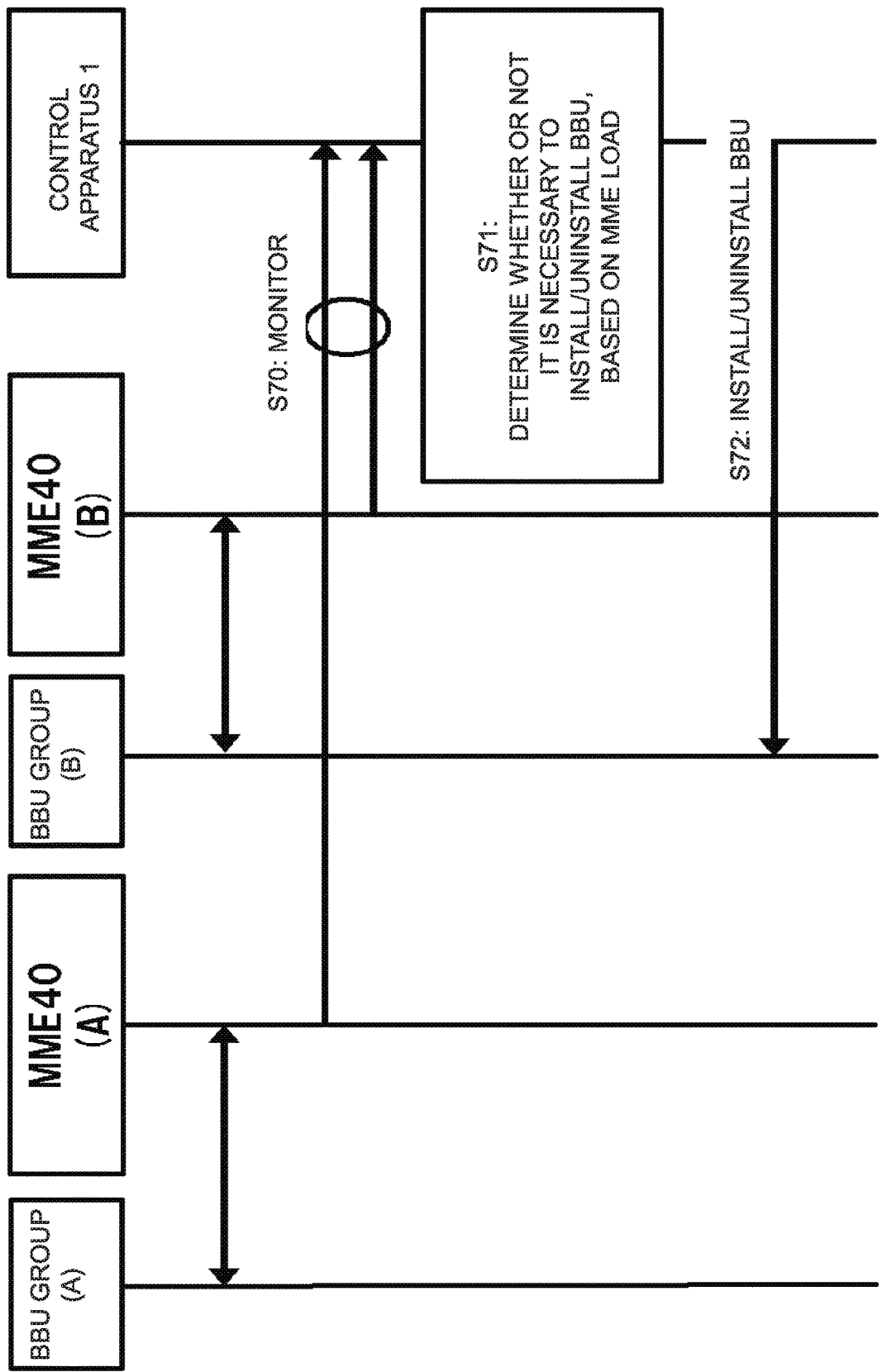
FIG. 29 is a sequence chart showing a second example of operation in the communication system according to the fifth exemplary embodiment.

FIG. 29 is a sequence chart showing another example of operation in the fifth exemplary embodiment. In the example of FIG. 29, the control apparatus 1 installs a BBU 21 based on the status of MMEs 40 in a core network 4.

In the example of FIG. 29, a plurality of BBUs 21 (a BBU group (A) in the figure) are connected to an MME 40(A). Moreover, a BBU group (B) is connected to an MME 40(B).

The control apparatus 1 monitors the status of each MME 40 via the interface 10 (Operation S70). For example, the control apparatus 1 monitors the load on each MME 40.

For example, the VM control section 13 determines whether or not it is necessary to install software (a virtual machine) having the functions of a BBU 21, based on the loads on the MMEs 40 (Operation S71). In the example of FIG. 29, it is also possible that the MMEs 40 have the functions of the control apparatus 1. In this case, for example, each MME 40 can monitor the load on its own apparatus and determine whether or not it is necessary to install a BBU 21.

The VM control section 13 installs or uninstalls a BBU 21, depending on the load on an MME 40.

For example, the VM control section 13 installs a BBU 21 when an MME 40 exists that is under a load equal to or higher than a predetermined threshold. For example, the VM control section 13 installs a BBU 21 so that the installed BBU 21 will be associated with an MME 40 under a load equal to or lower than a predetermined threshold.

The control section 11 connects the installed BBU 21 and an RRH 22. For example, the control section 11 connects an RRH 22 connected to a BBU 21 that is associated with the MME 40 under a load equal to or higher than the predetermined threshold to the installed BBU 21.

Figure 30:
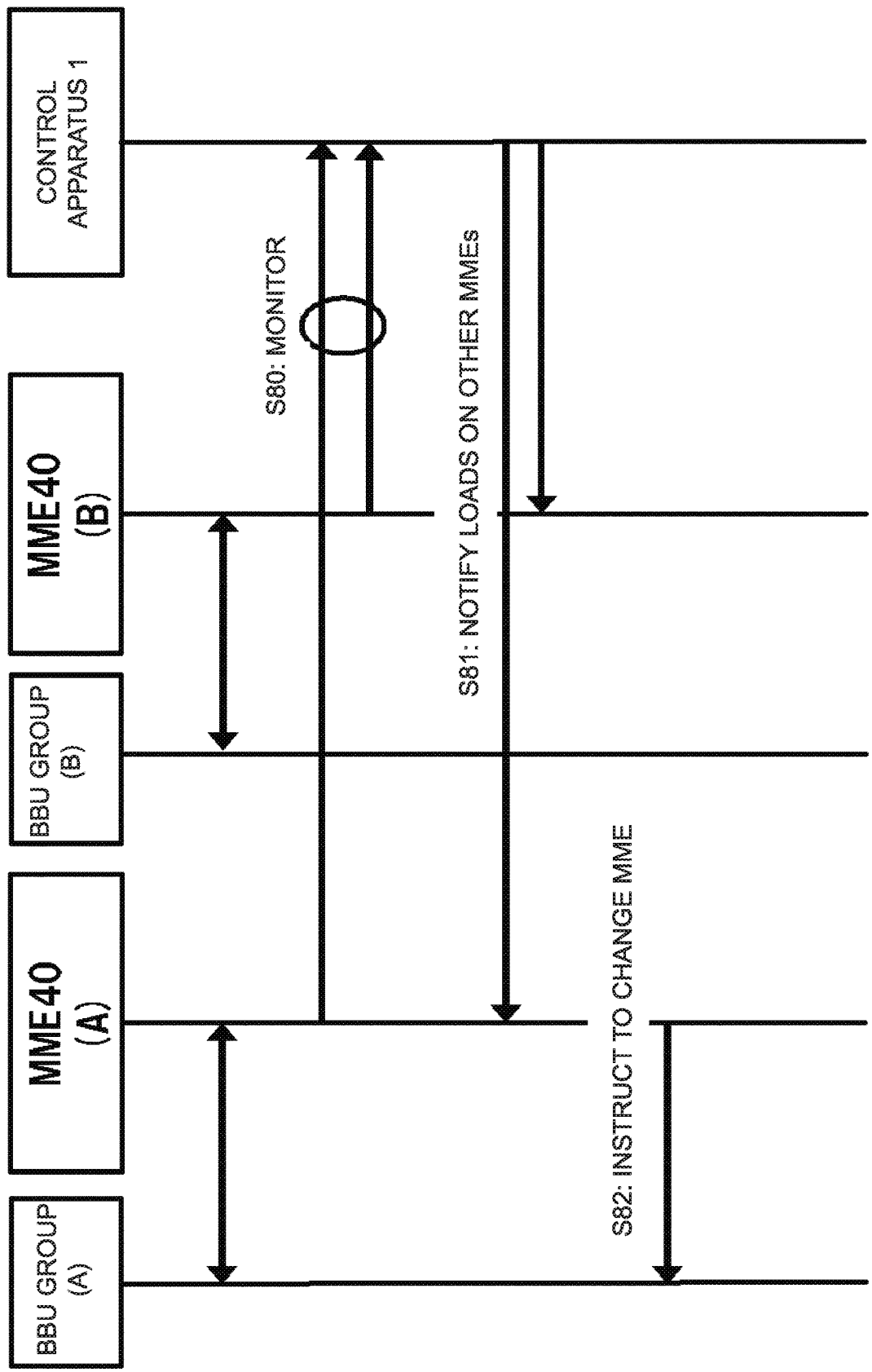
FIG. 30 is a sequence chart showing a third example of operation in the communication system according to the fifth exemplary embodiment.

FIG. 30 is a sequence chart showing another example of operation in the fifth exemplary embodiment. Through an example shown in FIG. 30, the control apparatus 1 can control a BBU 21 resource to be associated with an MME 40.

The control apparatus 1 monitors the status of each MME 40 via the interface 10 (Operation S80). For example, the control apparatus 1 monitors the load on each MME 40.

The control apparatus 1 notifies each MME 40 of the loads on the other MMEs 40 (Operation S81). In the example of FIG. 30, the control apparatus 1 notifies the load on an MME 40(A) to an MME 40(B), and notifies the load on the MME 40(B) to the MME 40(A). Note that in the example of FIG. 30, the MMEs 40 may include the functions of the control apparatus 1. In this case, each MME 40 can monitor the load on its own apparatus and notify the monitored load to the other MMEs 40.

Each MME 40 instructs a BBU 21 to change an MME 40 for the BBU 21 to connect to, based on the loads on the other MMEs 40 notified from the control apparatus 1 (Operation S82). For example, if the load on the own apparatus is higher than a predetermined threshold and another MME 40 exists that is under a load lower than a predetermined threshold, then the MME 40 instructs a BBU 21 to change its connection target to the another MME 40 under a load equal to or lower than the predetermined threshold. Based on the instruction from the MME 40, the BBU 21 chooses the MME 40 to connect to.

FIG. 30 shows an example in which the control apparatus 1 and the MMEs 40 are discrete apparatuses. However, the MMEs 40 may include the functions of the control apparatus 1. For example, in the above-described Operation S82, a control section 11 of an MME 40 instructs a BBU 21 to change an MME for the BBU 21 to connect to.

Exemplary embodiments of the present invention have been described hereinabove. However, the present invention is not limited to each of the above-described embodiments. The present invention can be implemented based on a modification of, a substitution of, and/or an adjustment to each exemplary embodiment. Moreover, the present invention can be also implemented by combining any of the exemplary embodiments. That is, the present invention incorporates the entire disclosure of this description, and any types of modifications and adjustments thereof that can be implemented based on technical ideas. Furthermore, the present invention can be also applied to the technical field of SDN (Software-Defined Network).

REFERENCE SIGNS LIST

1 Control apparatus
10 Interface
11 Control section
12 Authentication processing section
13 VM control section
2 Base station
21 BBU
22 RRH
23 Network
24 Terminal
25 Path switching section
250 Control interface
251 Data transmission section
252 Database
200 Control interface
201 Control section
202 X2 interface
210 Control interface
211 Communication section
212 Parameter storage section
220 Control interface
221 Communication section
222 Parameter storage section
230 Switch
2300 Reception light amplifier
2301 Demultiplexer
2302 DROP switch
2303 Multiplexer
2304 Transmission light amplifier
2305 ADD switch
3 Backhaul network
4 Core network
40 MME
41 Gateway

The invention claimed is:

1. A network control apparatus for controlling a first network which can be connected to at least one of a plurality of backhaul networks, wherein the first network includes a plurality of base stations, wherein each of the plurality of base stations is configured by a combination of a radio section and a baseband section, the network control apparatus comprising:
a first controller that is configured to acquire information related to a communication load on each of the plurality of backhaul, networks; and
a second controller that is configured to determine whether to install or uninstall a baseband section, depending on the information related to the communication load on each of the plurality of backhaul networks,
wherein, when the communication load of a first backhaul network connected to a first baseband section is higher than the communication load of a backhaul network connected to a second baseband section, the second controller installs the second baseband section connected to the second backhaul network, and
wherein the second controller controls the first network to change a destination baseband section to be connected to a radio section from the first baseband section to the second baseband section.

2. The network control apparatus according to claim 1, wherein
the first controller acquires the information related to communication loads on different backhaul networks, wherein a first communication load of the first backhaul network is equal to or higher than a predetermined value and a second communication load of the second backhaul network is lower than the predetermined value.

3. The network control apparatus according to claim 1, wherein the second controller notifies at least one of the radio section and the second baseband sections of source and destination addresses of data communication.

4. A base station included in a first network including a plurality of base stations, wherein the first network is controlled by a network control apparatus, wherein the first network can be connected to at least one of a plurality of backhaul networks, the base station comprising:
a radio section for communicating with a terminal by radio, wherein the radio section is one of a plurality of radio sections included in the first network;
a baseband section for performing baseband processing of a data received from the radio section, wherein the baseband section is a first baseband section of a plurality of baseband sections included in the first network;
an interface that communicates with the network control apparatus, wherein the network control apparatus determines whether to install or uninstall a baseband section for the base station depending on information related to a communication load on each of the plurality of backhaul networks, wherein when the communication load of a first backhaul network connected to the first baseband section is higher than the communication load of a backhaul network connected to a second baseband section, the network control apparatus installs the second baseband section connected to the second backhaul network; and
a communication controller that is configured to change, the first baseband section to the second baseband section according to an instruction received from the network control apparatus via the interface,
wherein the communication controller is configured to control the radio section to change its connection to the first baseband section to the second baseband section based on the instruction received from the network control apparatus.

5. A network control method for controlling a first network which can be connected to at least one of a plurality of backhaul networks, wherein the first network includes a plurality of base stations, wherein each of the plurality of base stations is configured by a combination of a radio section and a baseband section, the method comprising:
acquiring information related to a communication load on each of the plurality of backhaul networks;
determining whether to install or uninstall a baseband section, depending on the information related to the communication load on each of the plurality of backhaul networks;
when the communication load of a first backhaul network connected to a first baseband section is higher than the communication load of a backhaul network connected to a second baseband section, installing the second baseband section connected to the second backhaul network; and
controlling the first network to change a destination baseband section to be connected to a radio section from the first baseband section to the second baseband section.

6. A communication method by a base station included in a first network controlled by a network control apparatus, wherein the first network can be connected to at least one of a plurality of backhaul networks, wherein the base station comprises:
a radio section for communicating with a terminal by radio, wherein the radio second is one of a plurality of radio sections included in the first network; and
a baseband section for performing baseband processing of data received from the radio section, wherein the baseband section is a first baseband section of a plurality of baseband sections included in the first network,
the method comprising:
communicating with the network control apparatus, wherein the network control apparatus determines whether to install or uninstall a baseband section for the base station depending on information related to a communication load on each of the plurality of backhaul networks, wherein when the communication load of a first backhaul network connected to the first baseband section is higher than the communication load of a second backhaul network connected to a second baseband section, the network control apparatus installs the second baseband section connected to the second backhaul network;
changing the first baseband section to the second baseband section according to an instruction received from the network control apparatus via the interface; and
controlling the radio section to change its connection to the first baseband section to the second baseband section based on the instruction received from the network control apparatus.

7. A communication system comprising:
a first network including a plurality of base stations, wherein each of the plurality of base stations is configured by a combination of a radio section and a baseband section;
a plurality of backhaul networks; and
a network control apparatus, which comprises:
a first controller that is configured to acquire information related to a communication load on each of the plurality of backhaul networks; and
a second controller that is configured to determine whether to install or uninstall a baseband section, depending on the information related to the communication load on each of the plurality of backhaul networks,
wherein, when the communication load of a first backhaul network connected to a first baseband section is higher than the communication load of a backhaul network connected to a second baseband section, the second controller installs the second baseband section connected to the second backhaul network, and
wherein the second controller controls the first network to change a destination baseband section to be connected to a radio section from the first baseband section to the second baseband section.

* * * * *

UNITED STATES PATENT AND TRADEMARK OFFICE
CERTIFICATE OF CORRECTION

PATENT NO. : 10,750,514 B2
APPLICATION NO. : 15/118595
DATED : August 18, 2020
INVENTOR(S) : Fujinami It is certified that error appears in the above-identified patent and that said Letters Patent is hereby corrected as shown below:

In the Claims

Claim 1, Column 20, Line 60, "the communication load of a backhaul network" should read --the communication load of a second backhaul network--.

Claim 4, Column 21, Line 34-35, "the communication load of a backhaul network" should read --the communication load of a second backhaul network--.

Claim 5, Column 21, Lines 61-62, "the communication load of a backhaul network" should read --the communication load of a second backhaul network--.

Claim 7, Column 22, Line 57, "the communication load of a backhaul network" should read --the communication load of a second backhaul network--.

Signed and Sealed this
Twenty-ninth Day of December, 2020

Andrei Iancu
*Director of the United States Patent and Trademark Office*